US009649614B2

(12) United States Patent
Lebl et al.

(10) Patent No.: US 9,649,614 B2
(45) Date of Patent: *May 16, 2017

(54) METHODS AND COMPOSITIONS FOR PROCESSING CHEMICAL REACTIONS

(71) Applicant: ILLUMINA, INC., San Diego, CA (US)

(72) Inventors: Michal Lebl, San Diego, CA (US); Michel Perbost, San Diego, CA (US); Chad F. Derosier, San Diego, CA (US); Mark J. Nibbe, San Diego, CA (US); Steve R. Burgett, San Diego, CA (US); David L. Heiner, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,325

(22) Filed: May 29, 2015

(65) Prior Publication Data

US 2015/0314259 A1 Nov. 5, 2015

Related U.S. Application Data

(62) Division of application No. 13/008,317, filed on Jan. 18, 2011, now Pat. No. 9,073,033.

(Continued)

(51) Int. Cl.
*B01L 3/00* (2006.01)
*B01J 19/22* (2006.01)
(Continued)

(52) U.S. Cl.
CPC ............. *B01J 19/22* (2013.01); *B01J 14/005* (2013.01); *B01J 19/0046* (2013.01); *B01L 3/50851* (2013.01); *B01J 2219/0036* (2013.01); *B01J 2219/0038* (2013.01); *B01J 2219/00306* (2013.01); *B01J 2219/00324* (2013.01); *B01J 2219/00351* (2013.01); *B01J 2219/00378* (2013.01); *B01J 2219/00495* (2013.01); *B01J 2219/00518* (2013.01);
(Continued)

(58) Field of Classification Search
CPC ............. B01L 3/5085; B01L 2300/829; B01L 3/50853
USPC ................................. 422/553, 552, 554, 503
See application file for complete search history.

(56) References Cited

U.S. PATENT DOCUMENTS 3,586,484 A 6/1971 Anderson
4,042,338 A 8/1977 Huber
(Continued)

FOREIGN PATENT DOCUMENTS

EP 1128310 8/2001
WO 97/33737 9/1987
(Continued)

OTHER PUBLICATIONS

Azhayev, et al., "Amide group assisted 3'-dephosphorylation of oligonucleotides synthesized on universal A-supports", Tetrahedron, 57, 2001, 4977-4986.
(Continued)

*Primary Examiner* — Natalia Levkovich
(74) *Attorney, Agent, or Firm* — Illumina, Inc.

(57) ABSTRACT

Disclosed herein are compositions, methods and systems for the processing of chemical reactions, such as the synthesis of polymers.

23 Claims, 5 Drawing Sheets

Related U.S. Application Data

(60) Provisional application No. 61/296,371, filed on Jan. 19, 2010.

(51) Int. Cl.
*B01J 14/00* (2006.01)
*B01J 19/00* (2006.01)
*B01L 7/00* (2006.01)

(52) U.S. Cl.
CPC ............ *B01J 2219/00533* (2013.01); *B01J 2219/00585* (2013.01); *B01J 2219/00596* (2013.01); *B01J 2219/00644* (2013.01); *B01J 2219/00686* (2013.01); *B01J 2219/00693* (2013.01); *B01J 2219/00722* (2013.01); *B01L 7/5255* (2013.01); *B01L 2300/069* (2013.01); *B01L 2300/0812* (2013.01); *B01L 2300/0829* (2013.01); *B01L 2300/123* (2013.01)

(56) References Cited

U.S. PATENT DOCUMENTS

| | | | |
|---|---|---|---|
| 4,061,701 A | 12/1977 | Stastny et al. | |
| 4,158,085 A | 6/1979 | Bilhorn | |
| 4,469,863 A | 9/1984 | Ts'o et al. | |
| 4,808,380 A | 2/1989 | Minekane | |
| 4,844,868 A | 7/1989 | Rokugawa | |
| 4,883,642 A | 11/1989 | Bisconte et al. | |
| 4,906,433 A | 3/1990 | Minekane | |
| 5,034,506 A | 7/1991 | Summerton et al. | |
| 5,084,242 A | 1/1992 | Sakuma et al. | |
| 5,216,141 A | 6/1993 | Benner | |
| 5,235,033 A | 8/1993 | Summerton et al. | |
| 5,342,585 A | 8/1994 | Lebl et al. | |
| 5,386,023 A | 1/1995 | Sanghvi et al. | |
| 5,434,083 A | 7/1995 | Mitsumaki et al. | |
| 5,472,672 A | 12/1995 | Brennan | |
| 5,602,240 A | 2/1997 | De Mesmaeker et al. | |
| 5,614,608 A | 3/1997 | Krychnak et al. | |
| 5,637,684 A | 6/1997 | Cook et al. | |
| 5,644,048 A | 7/1997 | Yau | |
| 5,688,370 A | 11/1997 | Hagen et al. | |
| 5,688,940 A | 11/1997 | Lyttle | |
| 5,738,829 A | 4/1998 | Kempe | |
| 5,800,992 A | 9/1998 | Fodor et al. | |
| 5,814,700 A | 9/1998 | Brennan | |
| 5,888,723 A | 3/1999 | Sutton et al. | |
| 6,023,540 A | 2/2000 | Walt et al. | |
| 6,028,189 A | 2/2000 | Blanchard | |
| 6,121,054 A | 9/2000 | Lebl | |
| 6,130,046 A | 10/2000 | Hubbell et al. | |
| 6,264,891 B1 | 7/2001 | Heyneker et al. | |
| 6,327,410 B1 | 12/2001 | Walt et al. | |
| 6,375,898 B1 | 4/2002 | Ulrich | |
| 6,376,256 B1 | 4/2002 | Dunnington et al. | |
| 6,384,210 B1 | 5/2002 | Blanchard | |
| 6,423,536 B1 | 7/2002 | Jovanovich et al. | |
| 6,429,027 B1 | 8/2002 | Chee et al. | |
| 6,558,633 B1 | 5/2003 | Ecker et al. | |
| 6,653,468 B1 | 11/2003 | Guzaev et al. | |
| 6,663,832 B2 | 12/2003 | Lebl et al. | |
| 6,682,702 B2 | 1/2004 | Barth et al. | |
| 6,770,441 B2 | 8/2004 | Dickinson et al. | |
| 6,841,663 B2 | 1/2005 | Lefkowitz et al. | |
| 6,846,460 B1 | 1/2005 | Lebl | |
| 6,858,394 B1 | 2/2005 | Chee et al. | |
| 6,867,050 B2 | 3/2005 | Peck et al. | |
| 6,878,345 B1 | 4/2005 | Astle | |
| 6,951,682 B1 | 10/2005 | Zebala | |
| 7,135,565 B2 | 11/2006 | Dellinger et al. | |
| 7,300,798 B2 | 11/2007 | Perbost et al. | |
| 7,390,459 B2 | 6/2008 | Lebl et al. | |
| 7,491,817 B2 | 2/2009 | Azhayev et al. | |
| 7,576,119 B2 | 8/2009 | Ravikumar et al. | |
| 7,579,459 B2 | 8/2009 | Ngo et al. | |
| 7,612,020 B2 | 11/2009 | Stuelpnagel et al. | |
| 7,622,294 B2 | 11/2009 | Walt et al. | |
| 2002/0028159 A1* | 3/2002 | Lebl | B01J 19/0046 422/533 |
| 2003/0029787 A1 | 2/2003 | Liu et al. | |
| 2004/0023019 A1 | 2/2004 | Vandenberg et al. | |
| 2004/0219063 A1 | 11/2004 | Heiner et al. | |
| 2005/0048667 A1 | 3/2005 | Ellman et al. | |
| 2005/0173059 A1 | 8/2005 | Ringleben et al. | |
| 2005/0281719 A1 | 12/2005 | Brennan | |
| 2007/0110638 A1 | 5/2007 | Heiner et al. | |

FOREIGN PATENT DOCUMENTS

| | | |
|---|---|---|
| WO | 89/08705 | 9/1989 |
| WO | 92/00091 | 1/1992 |
| WO | 92/00799 | 1/1992 |
| WO | 98/41534 | 9/1998 |
| WO | 99/32508 | 7/1999 |
| WO | 00/21658 | 4/2000 |
| WO | 01/60520 | 8/2001 |
| WO | 02/04123 | 1/2002 |
| WO | 02/16040 | 2/2002 |
| WO | 03/031054 | 4/2003 |

OTHER PUBLICATIONS

Beaucage, et al., "The Functionalization of Oligonucleotides Via Phosphoramidite Derivatives", Tetrahedron, 49 (10), 1993, 1925-1963.

Bergstrom, et al., "Comparison of the base pairingproperties of a series of nitroazole nucleobase analogs in the oligodeoxyribonucleotide sequence 5'-d(GCXAATTYGCG)-3'", NAR, 25(10), 1997, 1935-42.

Boal, et al., "Cleavage of oligodeoxyribonucleotides from controlled-pore glass supports and their rapid deprotection by gaseous amines", NAR, 24(15), 1996, 3115-3117.

Brill, et al., "Synthesis of Oligodeoxynucleoside Phosphorodithioates via Thioamidites.", J. Am. Chem. Soc. vol. 111,, 1989, 2321-2322.

Carlsson, et al., "Screening for Genetic Mutation", Nature, vol. 380., 1996, 207.

Dempcy, et al., "Synthesis of Thymidyl Pentamer of Deoxyribonucleic Guanidine and Binding Studies with DNA Homopolynucleotides.", Proc. Natl. Acad. Sci. vol. 92., 1995, 6097-6101.

Eckstein, "Oligonucleotides and Analogues: A Practical Approach", Oxford University Press, 1991.

Egholm, et al., "PNA Hybridizes to Complementary Oligonucleotides Obeying the Watson-Crick Hydrogen-Bonding Rules.", Nature.vol. 365., 1993, 566-568.

Egholm, M, "Peptide nucleic acids (PNA). Oligonucleotide analogs with an achiral peptide backbone", J.Am. Chem. Soc., 1992, pp. 1895-1897, vol. 14., 1992, 1895-1897.

Fotin, et al., "Parallel thermodynamic analysis of duplexes on oligodeoxyribonucleotide microchips", NAR, 26(6), 1998, 1515-1521.

Gait, "Oligonucleotide Synthesis: A Practical Approach", IRL Press, Oxford, 225 pages, 1984.

Gao, et al., "Unusual conformation of a 3'-thioformacetal linkage in a DNA duplex", J. Biomolecular NMR 4, 1994, 17-34.

Goodman, et al., "Synthesis of peptides and peptidomimetics", E22a Georg Thieme Verlag Stuttgart, New York, 2002.

Guzaev, et al., "A conformationally preorganized universal solid support for efficient oligonucleotide synthesis", J Am Chem Soc., 125(9), 2003, 2380-2381.

Horn, T., et al., "Oligonucleotides with Alternating Anionic and Cationic Phosphoramidate Linkages: Synthesis and Hybridization of Stereo-uniform Isomers", Tetrahedron Lett. 37(6), 1996, 743-746.

Jenkins, G N., et al., "The Biosynthesis of Carbocyclic Nucleosides", Chem.Soc. Rev., 1995, 169-176.

Letsinger, "Cationic Oligonucleotides", J.Am. Chem. Soc., 1988, p. 4470, vol. 110, USA, 1988, 4470-71.

(56) References Cited

OTHER PUBLICATIONS

Letsinger, et al., "Effects of pendant groups at phosphorus on binding properties of d-ApA Analogues", Nucleic Acid Res., 1986, vol. 14., Oxford, England, 1986, 3487-99.

Letsinger, et al., "Hybridization of Alternating Cationic/Anionic Oligonucleotides to RNA Segments", Nucleoside & Nucleotide, 1994, pp. 1597-1605, vol. 13., 1994, 1597-1605.

Letsinger, R. L., "Phosphoramidate analogs of oligonucleotides", J. Org. Chem., vol. 35, No. 11., 1970, 3800-3803.

Loakes, et al., "3-Nitropyrrole and 5-nitroindole as universal bases in primers for DNA sequencing and PCR", NAR, 23(13), 1995, 2361-2366.

Loakes, et al., "5-Niroindole as an universal base analogue", NAR, 22, 1994, 4039-4043.

Loakes, et al., "Stability and structure of DNA oligonucleotides containing non-specific base analogues", J. Mol. Biol., 270, 1997, 426-435.

Mag, et al., "Synthesis and Selective Cleavage of an Oligonucleotide Containing a Bridged Internucleotide 5'-phosphorothioate Linkage.", Nucleic Acids Res. vol. 19, No. 7, 1991, 1437-1441.

Meier, et al., "Peptide Nucleic Acids (PNA).-Unusual Properties of Nonionic Oligonucleotide Analogues", Angew. Chem. Int. Ed. Engl. vol. 31, No. 8., 1992, 1008-1010.

Mesmaeker, A D., et al., "Comparison of Rigid and Flexible Backbones in Antisense Oligonucleotides", Bioorganic and Medicinal Chem. Lett. vol. 4, 1994, 395-398.

Mullah, et al., "Automated synthesis of double dye-labeled oligonucleotides using tetramethylrhodamine (TAMRA) solid supports", Tetrahedron Lett., 38(33), 1997, 5751-5754.

Nichols, et al., "A Universal Nucleoside for Uses at Ambiguous Sites in DNA Primers", Nature 369, 1994, 492.

Pauwels, et al., "Biological Activity of New 2-5A Analogues", Chemica Scripta.vol. 26., 1986, 141-145.

Pon, et al., "Hydroquinone-O, O'-diacetic acid ('Q-linker') as a replacement for succinyl and oxalyl linker arms in solid phase oligonucleotide synthesis", NAR, 25(18), 1997, 3629-3635.

Sanghvi, Y.S. and, Cook, P. Dan, Eds., et al., "Carbohydrate Modifications in Antisense Research", ASC Symposium Series 580, Ch 2, 3, 6 and 7, American Chemical Society, Washington D.C. 1994.

Sawai, "Synthesis and Properties of Oligoadenylic Acids Containing 2'-5' Phosphoramide Linkage.", Chemistry Letters, 1984, 805-808.

Song, et al., "Unexpected results and recourse in process optimization of nucleoside 3'-O-succinates", Nucleosides, Nucleotides & Nucleic Acids, 20(4-7), 2001, 1267-1270.

Sprinzl, et al., "Enzymatic Incorporation of ATP and CTP Analogues into the 3' End tRNA.", Eur. J. Biochem., vol. 81, 1977, 579-589.

Van Aerschot, et al., "An acyclic 5-nitroindazole nucleoside analogue as ambiguous nucleoside", NAR, 23(21), 1995, 4363-4370.

Von Kiedrowski, et al., "Parabolic growth of a self-replicating hexadeoxynucloetide bearing a 3'-5'-phosphoamidate linkage", Angew. Chem. Intl. Ed. English, vol. 30, 1991, 423-26.

Watson, et al., "Molecular biology of the gene", Fourth Edition, The Benjamin/Cummings Pub. Co., Inc., 1987, 224.

\* cited by examiner

METHODS AND COMPOSITIONS FOR PROCESSING CHEMICAL REACTIONS

RELATED APPLICATIONS

This application is a divisional of U.S. patent application Ser. No. 13/008,317, filed Jan. 18, 2011, now pending, which is a non-provisional application of U.S. Provisional Application No. 61/296,371 filed Jan. 19, 2010, the contents of each is incorporated by reference in its entirety.

FIELD OF THE INVENTION

The methods, compositions and systems provided herein relate to the processing of chemical reactions. In particular, methods, compositions, and systems for the synthesis of polymers are described.

BACKGROUND

Many techniques in modern molecular biology employ synthetic polynucleotides. Some of these techniques include, but are not limited to, DNA sequencing, the polymerase chain reaction (PCR), site directed mutagenesis, whole gene assembly, and single-nucleotide polymorphism (SNP) analysis. Unlike many other reagents used in molecular biology, polynucleotides are not generally available as stock items but are custom made to each user's specification. For example, the sequence, scale, purity, and modifications of a polynucleotide can be specified by the user.

Improvements in polynucleotide synthesis chemistry and processing technology have led to more rapid synthesis at a lower cost. However, polynucleotide synthesis remains a complex, multi-step process that requires a series of high efficiency chemical reactions.

SUMMARY

The present invention relates to methods, compositions and systems for processing of chemical reactions. In particular, methods, compositions, and systems for the synthesis of polymers are described.

Some embodiments include an apparatus comprising a substrate having a top surface and a bottom surface, said top surface comprising a plurality of depressions and said bottom surface comprising a plurality of raised areas, each raised area corresponding to a depression in the top surface, and a porous material fixed in at least some of the depressions, wherein the porous material has a surface area to volume ratio greater than five. In some embodiments, the depressions are arranged in rows.

In certain embodiments, the substrate comprises a pliable sheet. In some embodiments, the pliable sheet comprises polypropylene. In other embodiments, the pliable sheet is adapted to form a belt. In some embodiments, at least one edge of the sheet is adapted to contact a roller for moving the sheet. In some embodiments, at least one edge of the substrate is perforated.

In certain embodiments, the porous material described herein comprises controlled pore glass (CPG). In some embodiments, the controlled pore glass (CPG) is present as a powder. In some embodiments, the porous material comprises pores greater than about 500 Å. In other embodiments, the porous material comprises pores less than about 500 Å. In preferred embodiments, the porous material comprises pores ranging from about 500 Å to about 3000 Å.

In certain embodiments, the plurality of depressions comprises a plurality of wells. In preferred embodiments, each well comprises a volume less than about 10 µl. In other preferred embodiments, each well comprises less than about 500 µg of controlled pore glass (CPG). In some embodiments, the porous material comprises a plurality of reaction sites, wherein a proportion of the reaction sites are blocked. In some embodiments, the depressions are patterned on the substrate.

In preferred embodiments of the compositions, methods and systems described herein, the chemical reactions are nucleic acid synthesis reactions and said porous material has at least one component of the nucleic acid synthesis reactions attached thereto.

In addition to the foregoing, embodiments of the present invention also relate to methods of manufacturing an apparatus for processing chemical reactions. Some methods include providing a substrate, forming a plurality of depressions in the substrate, providing a porous material to at least some of the depressions, and fixing the porous material in said at least some of the depressions.

In certain embodiments, the substrate comprises a pliable sheet. In some embodiments, the pliable sheet comprises polypropylene. Some embodiments further comprise the step of joining the ends of the pliable sheet to form a belt. Additional embodiments further comprise the step of perforating at least one edge of the substrate.

In certain embodiments, the porous material described herein comprises controlled pore glass (CPG). In some embodiments, the controlled pore glass (CPG) is provided as a powder. In some embodiments, the porous material comprises pores greater than about 500 Å. In other embodiments, the porous material comprises pores less than about 500 Å. In preferred embodiments, the porous material comprises pores ranging from about 500 Å to about 3000 Å.

In certain embodiments, the plurality of depressions comprises a plurality of wells. In preferred embodiments, each well comprises a volume less than about 10 µl. In some embodiments, the depressions are patterned on the substrate. In other embodiments, the porous material comprises a plurality of reaction sites.

Additional embodiments further include the step of applying a blocking agent to the porous material, thereby blocking at least some of the reaction sites.

In some embodiments of the methods described herein, the step of fixing the porous material comprises temporarily increasing the plasticity of the substrate. In other embodiments, the plasticity of the substrate is increased by heating the substrate. In still other embodiments, the plasticity of the substrate is increased by exposing the substrate to an organic solvent.

Additional methods also include the step of attaching at least one component of a chemical reaction, for example a nucleic acid synthesis reaction, to said porous material.

In addition to the foregoing compositions and methods, the present invention also relates to a chemical reaction processing system. Such systems include a substrate comprising a plurality of depressions and a porous material comprising a plurality of reaction sites, said porous material fixed in at least some of the depressions of said plurality of depressions, and one or more dispensing stations configured to dispense a liquid reagent into said at least some of the depressions.

In some embodiments, each of said one or more dispensing stations comprises a plurality of nozzles. In certain embodiments, the nozzles are piezo-activated nozzles.

In preferred embodiments of the systems described herein, the porous material has a surface area to volume ratio greater than five.

Some embodiments also include a sensor for detecting the presence of a depression at a dispensing station. Such sensor permits the dispensing station to begin dispensing upon, or shortly after, the detection of the leading edge of a depression. For example, in some embodiments, the sensor activates dispensing from the dispensing station when a leading edge of a depression engages the sensor. In some embodiments, the sensor deactivates dispensing from the dispensing station when a trailing edge of a depression engages the sensor.

Some embodiments also include a reagent removal system. In some embodiments, the reagent removal system comprises an inlet that produces a stream of gas capable of extracting reagent from the porous material. In some embodiments, the reagent removal system further comprises an outlet that produces a vacuum that is capable of removing reagent extracted from the porous material. In such embodiments, the vacuum may or may not alone be capable of extracting reagent from the porous material. In some embodiments, the reagent removal system comprises an outlet that produces a vacuum that is capable of extracting reagent from the porous material.

Certain embodiments described herein also include a control system that coordinates reagent dispensing and reagent removal. In some embodiments, the one or more dispensing stations dispense reagents selected from a deblock reagent, a monomer reagent, an oxidizing reagent, a capping reagent and a wash reagent. In some embodiments, the one or more dispensing stations dispense reagents at a rate ranging from about 5 pl/ms to about 500 nl/ms.

In some embodiments of the systems described herein, the substrate comprises a pliable sheet. In some embodiments, the pliable sheet comprises polypropylene. In other embodiments, the substrate is adapted to form a belt. In some embodiments, at least one edge of the belt is adapted to contact a roller for moving the belt. In some embodiments, at least one edge of the substrate is perforated.

In certain embodiments, the porous material described herein comprises controlled pore glass (CPG). In some embodiments, the controlled pore glass (CPG) is present as a powder. In some embodiments, the porous material comprises pores greater than about 500 Å. In other embodiments, the porous material comprises pores less than about 500 Å. In preferred embodiments, the porous material comprises pores ranging from about 500 Å to about 3000 Å.

In certain embodiments, the plurality of depressions comprises a plurality of wells. In preferred embodiments, each well comprises a volume less than about 10 μl. In other embodiments, the depressions are patterned on the substrate.

In certain embodiments of the systems described herein, the substrate comprises a plurality of reaction sites. In some such embodiments, at least some of the reaction sites are blocked.

In some embodiments, the chemical reactions are nucleic acid synthesis reactions and said porous material has at least one component of the nucleic acid synthesis reactions attached thereto.

In addition to the foregoing, embodiments of the present invention also include methods for processing chemical reactions comprising obtaining a substrate comprising a plurality of depressions and a porous material comprising a plurality of reaction sites, said porous material fixed in at least some of the depressions of said plurality of depressions, and providing a liquid reagent to the porous material by moving the substrate so that the depressions receive said reagent from one or more dispensing stations.

In some embodiments, each of said one or more dispensing stations comprises a plurality of nozzles. In certain embodiments, the nozzles are piezo-activated nozzles.

In preferred embodiments of the methods for processing chemical reactions described herein, the porous material has a surface area to volume ratio greater than five.

Additional embodiments of the methods for processing chemical reactions described herein also include the step of detecting the presence of a depression at a dispensing station. In some embodiments, detecting comprises engaging a sensor with a leading edge of a depression, thereby activating dispensing from the dispensing station. In some embodiments, the detecting comprises engaging a sensor with a trailing edge of a depression, thereby deactivating dispensing from the dispensing station.

Other embodiments of the methods for processing chemical reactions described herein also include the step of removing said reagent. In some embodiments, the removing the reagent comprises directing a stream of gas to said depressions, thereby extracting reagent from the porous material. In certain embodiments, the removing the reagent further comprises directing a vacuum to said depressions, thereby removing reagent extracted from the porous material by said stream of gas. In some embodiments, the removing the reagent comprises directing a vacuum to said depressions, thereby extracting reagent from the porous material.

In some embodiments, the one or more dispensing stations dispense reagents selected from a deblock reagent, a monomer reagent, an oxidizing reagent, a capping reagent and a wash reagent.

In some embodiments, the substrate is moved at a rate ranging from about 10 μm/second to about 10 cm/second.

In certain embodiments of the methods for processing chemical reactions described herein, the substrate comprises a pliable sheet. In some embodiments, the pliable sheet comprises polypropylene. In some embodiments, the substrate is adapted to form a belt. In some embodiments, at least one edge of the belt is adapted to contact a roller for moving the belt. In certain embodiments, at least one edge of the substrate is perforated.

In preferred embodiments of the methods for processing chemical reactions described herein, the reagent comprises at least one component of a nucleic acid synthesis reaction.

Additional embodiments of the methods for processing chemical reactions described herein also include coiling the substrate and placing the substrate into a chamber. In such embodiments, the chamber can comprise gaseous reactants, catalysts or cleaving reagents, such as ammonia or methylamine. In a preferred embodiment, the chamber comprises gaseous ammonia or methylamine and the chemical reactions comprise nucleic acid synthesis reactions.

Some embodiments of the methods for processing chemical reactions described herein include eluting nucleic acids from the porous material by providing an elutant to the plurality of depressions.

In certain embodiments, the porous material comprises controlled pore glass (CPG). In some embodiments, the controlled pore glass (CPG) is present as a powder. In some embodiments, the porous material comprises pores greater than about 500 Å. In other embodiments, the porous material comprises pores less than about 500 Å. In preferred embodiments, the porous material comprises pores ranging from about 500 Å to about 3000 Å.

In certain embodiments, the plurality of depressions comprises a plurality of wells. In preferred embodiments, each well comprises a volume less than about 10 µl. In other preferred embodiments, the depressions are patterned on the substrate.

Some preferred embodiments of the methods for processing chemical reactions described herein further include the step of blocking at least some of the reaction sites.

In addition to the foregoing, some embodiments of the present invention relate to methods for reducing the cost of performing a chemical reaction. Some such methods include (a) obtaining a substrate comprising a plurality of depressions and a porous material comprising a plurality of reaction sites, said porous material fixed in at least some of the depressions of said plurality of depressions, (b) providing a first liquid reagent to depressions comprising said porous material, wherein said first liquid reagent is absorbed by the porous material, (c) providing a second liquid reagent to depressions comprising said porous material, wherein said second liquid reagent is absorbed by the porous material, and wherein the combined volume of the first liquid reagent and the second liquid reagent is substantially contained within the porous material, and (d) allowing sufficient time for the chemical reaction, thereby performing the chemical reaction at a reduced cost.

In preferred embodiments of the methods for reducing the cost of performing a chemical reaction, the amount of the first liquid reagent is less than about 1 µl. In especially preferred embodiments, the amount of the first liquid reagent is less than about 100 nl.

Additional embodiments of the methods for reducing the cost of performing a chemical reaction include a further step of removing the first liquid reagent from the porous material.

Some of the methods for reducing the cost of performing a chemical reaction, also include dispensing at least a second liquid reagent to depressions comprising said porous material. In such embodiments, the first or second liquid reagent comprises at least one component of a nucleic acid synthesis reaction. In some embodiments, the first or second liquid reagent is selected from a deblock reagent, a monomer reagent, an oxidizing reagent, a capping reagent and a wash reagent.

In certain embodiments, the substrate comprises a pliable sheet. In some embodiments, the pliable sheet comprises polypropylene. In other embodiments, the substrate is adapted to form a belt. In some embodiments, at least one edge of the belt is adapted to contact a roller for moving the belt. In other embodiments, at least one edge of the substrate is perforated.

In preferred embodiments of the method for reducing the cost of preforming a chemical reaction, the chemical reactions comprise nucleic acid synthesis reactions.

In certain embodiments, the porous material comprises controlled pore glass (CPG). In some embodiments, the controlled pore glass (CPG) is present as a powder. In some embodiments, the porous material comprises pores greater than about 500 Å. In other embodiments, the porous material comprises pores less than about 500 Å. In preferred embodiments, the porous material comprises pores ranging from about 500 Å to about 3000 Å.

In certain embodiments, the plurality of depressions comprises a plurality of wells. In preferred embodiments, each well comprises a volume less than about 10 µl. In other preferred embodiments, the depressions are patterned on the substrate.

Additional methods for reducing the cost of performing a chemical reactions described herein further include the step of blocking at least some of the reaction sites.

In addition to the foregoing, some embodiments of the present invention relate to methods of reducing entanglement during polymer synthesis, wherein the method comprises the steps of: (1) obtaining a substrate comprising a plurality of depressions and a porous material comprising a plurality of reaction sites, said porous material fixed in at least some of the depressions of said plurality of depressions; and (2) reducing the density of reaction sites in the porous material by applying a blocking agent to the porous matrix, thereby reducing entanglement during extension of the polymers.

Other embodiments of the present invention relate to methods of reducing entanglement during polymer synthesis, wherein the method comprises the steps of: (1) obtaining a substrate comprising a plurality of depressions and a porous material comprising a plurality of reaction sites, said porous material fixed in at least some of the depressions of said plurality of depressions; and (2) providing a molecule to the porous material such that a portion of the plurality of reaction sites is occupied by the molecule, thereby reducing entanglement during extension of the polymers.

Some embodiments of the above-described methods of reducing entanglement during polymer synthesis also include providing a liquid reagent to depressions comprising said porous material.

In certain embodiments of the above-described methods of reducing entanglement during polymer synthesis, the substrate comprises a pliable sheet. In some embodiments, the pliable sheet comprises polypropylene. In other embodiments, the substrate is adapted to form a belt. In some embodiments, at least one edge of the belt is adapted to contact a roller for moving the belt. In other embodiments, at least one edge of the substrate is perforated.

In some embodiments of the above-described methods of reducing entanglement during polymer synthesis, the polymer synthesis comprises nucleic acid synthesis.

In certain embodiments of the above-described methods of reducing entanglement during polymer synthesis, the porous material comprises controlled pore glass (CPG). In some embodiments, the controlled pore glass (CPG) is present as a powder. In some embodiments, the porous material comprises pores greater than about 500 Å. In other embodiments, the porous material comprises pores less than about 500 Å. In preferred embodiments, the porous material comprises pores ranging from about 500 Å to about 3000 Å.

In certain embodiments of the above-described methods of reducing entanglement during polymer synthesis, the plurality of depressions comprises a plurality of wells. In preferred embodiments, each well comprises a volume less than about 10 µl. In other preferred embodiments, the depressions are patterned on the substrate.

DETAILED DESCRIPTION

Figure 1:
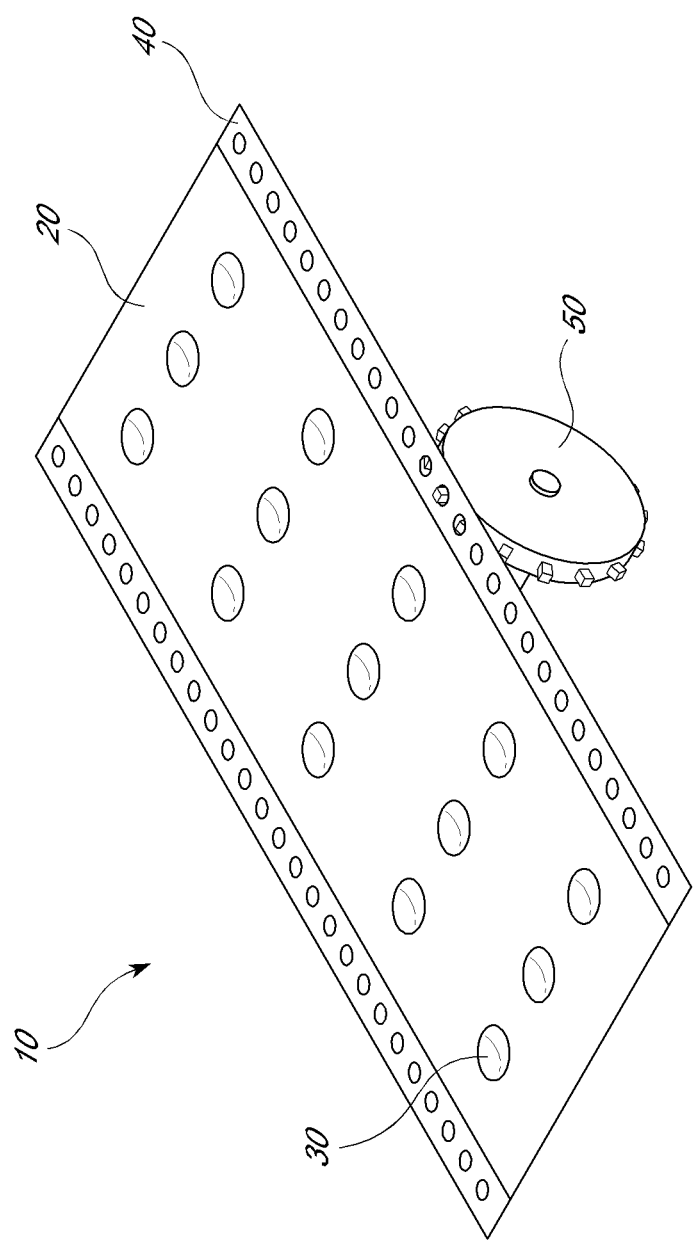
FIG. 1 shows an embodiment of an apparatus for processing chemical reactions with at least one edge adapted to be moved by a roller.

The present invention relates to methods, compositions and systems for the processing of chemical reactions. Some preferred embodiments, methods, compositions, and systems for continuous parallel synthesis of a plurality of polymers are provided. Especially preferred embodiments relate to methods, compositions and systems for the synthesis of nucleic acids.

Each of the methods, compositions, and systems described herein can include the use of one or more porous materials. Porous materials described herein are particularly advantageous as solid supports for polymer synthesis. The use of porous materials can significantly reduce the volume of liquid reagents that may be required for particular reactions. For example, a porous material can provide a large surface area for reaction sites that can be exposed to a liquid reagent. In addition, the use of a porous material can reduce the amount of a liquid reagent that may be lost to evaporation. Such losses can be particularly significant at low volumes of liquid reagent.

Although the methods, compositions and systems described herein can be used with, or adapted for use with, most types of chemical reactions, certain preferred embodiments of the present invention related to methods, compositions and systems for use with synthetic reactions. The methods, compositions and systems are particularly useful for synthetic reactions that include repetitive steps such as reactions for synthesizing polymers in which cycles of monomer addition are repeated until a polymer of a predefined or desired length is created. In especially preferred embodiments, the synthetic reactions include the synthesis of nucleic acids, such as oligonucleotide probes and primers. In some embodiments nucleoside phosphoramidites can be utilized. Such nucleoside phosphoramidites are examples of monomer reagents that may be utilized with the methods, compositions and systems described herein. Nucleoside phosphoramidates include derivatives of natural or synthetic nucleosides in which protection groups (sometimes referred to a blocking groups) are added to reactive exocyclic amine and hydroxy groups, and in which an N,N-diisopropyl phosphoramidite group is attached to the 3'-hydroxy group of each nucleoside. Examples of protecting groups include, but are not limited to, acid-labile dimethoxytrityl (DMT) groups.

In some embodiments of the methods, compositions and systems described herein, nucleic acids can be synthesized by covalently attaching a first nucleoside with DMT group to a solid support. The nucleoside can be attached to a solid support through a linker as described further herein. Nucleic acids can be synthesized through repeated cycles of deprotection and coupling.

In some embodiments described herein, a cycle of nucleic acid synthesis can include four steps. In particular, a typical nucleic acid synthesis cycle includes a deblocking step, a coupling step, a capping step, and an oxidation step. In the deblocking step, the DMT group of the attached nucleoside is removed with an acidic solution, for example, dichloroacetic acid or trichloroacetic acid in dichloromethane. In the coupling step, the phosphoramidite group of a nucleoside is activated by protonation using reagents such as an acidic azole catalyst, for example, tetrazole, 2-ethylthiotetrazole, 2-bezylthiotetrazole or 4,5-dicyanoimidazole. The mixture is brought into contact with the attached deblocked nucleoside or attached deblocked oligonucleotide of subsequent cycles. The activated phosphoramidite group reacts with the 5'-hydroxy group of the attached nucleoside. This reaction is sensitive to moisture and can be performed under anhydrous conditions, for example, using anhydrous acetonitrile. In the capping step, unreacted bound 5'-hydroxyoligonucleotides are quenched, for example by acetylation, or by providing the reactive hydroxyls with an electron deficient reaction center, in order to prevent the formation of side products during subsequent synthesis cycles. Reagents such as acetic anhydride and 1-methylimidazole can be used. In the oxidation step, the newly formed tricoordinated phosphite triester linkage can be treated with reagents such as iodine and water in the presence of a weak base, such as pyridine, lutidine, or collidine. Subsequent cycles typically begin with a deblocking step.

The synthetic process is carried out with a desired sequence of nucleotide additions and repeated until the oligonucleotides reach a desired sequence composition and length. At this point, the DMT group can be removed from the most 5' nucleoside residue and the nucleic acid can be cleaved from the solid support using agents such as aqueous ammonium hydroxide, aqueous methylamine, gaseous ammonia or gaseous methylamine.

Additional embodiments of the methods, compositions and systems described herein relate to the synthesis of other polymeric molecules. For example, compositions, methods, and systems described herein can be configured to synthesis polymers such as polypeptides. The process of peptide synthesis on solid supports generally involves building a peptide from the carboxyl-terminal end. The peptide is attached to a solid support via its carboxy-terminal amino acid and further includes a protecting group on the amino-terminal α-amino group. The protecting group is then cleaved off of the peptide to form a deprotected peptide. Next, a monomeric amino acid, also containing an α-amino protecting group, is contacted with the de-protected peptide under conditions for formation of a peptide bond between the α-amino group of the deprotected peptide and the α-carboxy group the monomeric amino acid. The monomeric amino acid can be provided in an activated form or an activating reagent can be added to the amino acid and growing peptide. Washes can be carried out between steps to remove reagents. The cycle of deprotecting the prior amino acid and coupling the additional amino acid can be repeated until a peptide of the desired length is synthesized. Any reactive side chains of the amino acids are typically protected by chemical groups that can withstand the coupling and α-amino deprotection procedure. These side chain protecting groups, however, can be removed at the end of the synthesis.

In certain embodiments of the methods, compositions and systems described herein that relate to synthesis reactions, dispensers can be configured to dispense a wash solution, deprotection reagent, amino acid, or activation reagent. The relative placement of the array of stations, relative placement of the array of reaction sites and the schedule by which the arrays communicate with each other can be correlated in accordance with the teachings herein and the known reaction schemes for peptide synthesis including, for example, those described in Goodman et al. (Eds.). Synthesis of Peptides and Peptidomimetics, Vol. E22a. Georg Thieme Verlag, Stuttgart (2002), incorporated by reference in its entirety.

Definitions

The term, "nucleotides" as used herein can refer to the building blocks of nucleic acids, including, but not limited to, naturally occurring and non-naturally occurring nucleotides, nucleosides, nucleotide analogs, nucleoside analogs, and the like. The term "nucleotide" can be used to describe a monomeric unit of a polynucleotide or to describe an individual molecule, for example, prior to being synthetically incorporated into a polynucleotide. Nucleosides typically comprise a nitrogenous base and a sugar, e.g., deoxyribose, ribose, or the like. Nucleotides generally comprise a nitrogenous base, a sugar, and a phosphate group, e.g., a monophosphate, a diphosphate, or a triphosphate. "Nitrogenous base" can refer to heterocyclic bases such as adenine, guanine, thymine, uracil cytosine, other purines and pyrimidines and derivatives thereof. Nucleotides typically comprise 5'-nucleoside phosphates including, but not limited to, deoxyadenosine 5'-triphosphate, deoxyguanosine 5'-triphosphate, deoxycytidine 5'-triphosphate, deoxythymidine 5'-triphosphate, deoxyuridine 5'-triphosphate, adenosine 5'-triphosphate, guanosine 5'-triphosphate, cytidine 5'-triphosphate, uridine 5'-triphosphate, thymidine-5'-triphosphate, and analogs thereof.

Nucleotide analogs can include nucleotides comprising a label moiety, e.g., a detectable label moiety. Detectable label moieties include, but are not limited to, fluorescent moieties and chemiluminescent moieties. Nucleotide and nucleoside analogs can be optionally synthetic, naturally occurring, or non-naturally occurring compounds that have similar properties to nucleotides and nucleosides and are typically metabolized in a similar manner. More examples include, but are not limited to, phosphorothioates, phosphoroamidates, methyl phosphonates, chiral-methylphosphonates, 2-O-methyl ribonucleotides, dideoxynucleotides, boronated nucleotides, and the like.

As used herein, "oligonucleotide" and/or "nucleic acid" and/or grammatical equivalents thereof can refer to at least two nucleotides linked together. A nucleic acid can generally contain phosphodiester bonds, however, in some embodiments, nucleic acid analogs may have other types of backbones, comprising, for example, phosphoramide (Beaucage, et al., Tetrahedron, 49:1925 (1993); Letsinger, J. Org. Chem., 35:3800 (1970); Sprinzl, et al., Eur. J. Biochem., 81:579 (1977); Letsinger, et al., Nucl. Acids Res., 14:3487 (1986); Sawai, et al., Chem. Lett., 805 (1984), Letsinger, et al., J. Am. Chem. Soc., 110:4470 (1988); and Pauwels, et al., Chemica Scripta, 26:141 (1986), incorporated by reference in their entireties), phosphorothioate (Mag, et al., Nucleic Acids Res., 19:1437 (1991); and U.S. Pat. No. 5,644,048), phosphorodithioate (Briu, et al., J. Am. Chem. Soc., 111: 2321 (1989), incorporated by reference in its entirety), O-methylphophoroamidite linkages (see Eckstein, Oligonucleotides and Analogues: A Practical Approach, Oxford University Press, incorporated by reference in its entirety), and peptide nucleic acid backbones and linkages (see Egholm, J. Am. Chem. Soc., 114:1895 (1992); Meier, et al., Chem. Int. Ed. Engl., 31:1008 (1992); Nielsen, Nature, 365:566 (1993); Carlsson, et al., Nature, 380:207 (1996), incorporated by reference in their entireties).

Other analog nucleic acids include those with positive backbones (Denpcy, et al., Proc. Natl. Acad. Sci. USA, 92:6097 (1995), incorporated by reference in its entirety); non-ionic backbones (U.S. Pat. Nos. 5,386,023; 5,637,684; 5,602,240; 5,216,141; and 4,469,863; Kiedrowski, et al., Angew. Chem. Intl. Ed. English, 30:423 (1991); Letsinger, et al., J. Am. Chem. Soc., 110:4470 (1988); Letsinger, et al., Nucleosides & Nucleotides, 13:1597 (1994); Chapters 2 and 3, ASC Symposium Series 580, "Carbohydrate Modifications in Antisense Research", Ed. Y. S. Sanghui and P. Dan Cook; Mesmaeker, et al., Bioorganic & Medicinal Chem. Lett., 4:395 (1994); Jeffs, et al., J. Biomolecular NMR, 34:17 (1994); Tetrahedron Lett., 37:743 (1996), incorporated by reference in their entireties) and non-ribose (U.S. Pat. No. 5,235,033; U.S. Pat. No. 5,034,506; and Chapters 6 and 7, ASC Symposium Series 580, "Carbohydrate Modifications in Antisense Research", Ed. Y. S. Sanghui and P. Dan Coo, incorporated by reference in their entireties). Nucleic acids may also contain one or more carbocyclic sugars (see Jenkins, et al., Chem. Soc. Rev., (1995) pp. 169 176).

Modifications of the ribose-phosphate backbone may be present to facilitate the addition of additional moieties such as labels, or to increase the stability of such molecules under certain conditions. In addition, mixtures of naturally occurring nucleic acids and analogs can be made. Alternatively, mixtures of different nucleic acid analogs, and mixtures of naturally occurring nucleic acids and analogs may be made. The nucleic acids may be single stranded or double stranded, as specified, or contain portions of both double stranded or single stranded sequence. The nucleic acid may be DNA, RNA or a hybrid. A nucleic acid can contain any combination of deoxyribo- and ribo-nucleotides, and any combination of bases, including uracil, adenine, thymine, cytosine, guanine, inosine, xanthanine, hypoxanthanine, isocytosine, isoguanine, and base analogs such as nitropyrrole (including 3-nitropyrrole) and nitroindole (including 5-nitroindole), etc. Accordingly, reactive analogs of the monomers set forth above can be used in a synthetic method or device described herein.

In some embodiments, a nucleic acid can include at least one promiscuous base. Promiscuous bases can base-pair with more than one different type of base. In some embodiments, a promiscuous base can base-pair with at least two different types of bases and no more than three different types of bases. An example of a promiscuous base includes inosine that may pair with adenine, thymine, or cytosine. Other examples include hypoxanthine, 5-nitroindole, acylic 5-nitroindole, 4-nitropyrazole, 4-nitroimidazole and 3-nitropyrrole (Loakes et al., Nucleic Acid Res. 22:4039 (1994); Van Aerschot et al., Nucleic Acid Res. 23:4363 (1995); Nichols et al., Nature 369:492 (1994); Berstrom et al., Nucleic Acid Res. 25:1935 (1997); Loakes et al., Nucleic Acid Res. 23:2361 (1995); Loakes et al., J. Mol. Biol. 270:426 (1997); and Fotin et al., Nucleic Acid Res. 26:1515 (1998), incorporated by reference in their entireties). Promiscuous bases that can base-pair with at least three, four or more types of bases can also be used.

As used herein, the term "amino acid" typically refers to any compound that contains an amine group, carboxylic group and R-group. Amino acids can either be either be naturally occurring or synthetic. An amino acid can include an L-amino acid or D-amino acid. The use of both L-amino acids and D-amino acid, either separately or together, is contemplated herein. Two, three or more amino acids may condense to form a di- tri- or poly-peptide, respectively. Amino acids can be represented by their standard 1-letter code or 3-letter code. An amino acid residue represented by "X" or "Xxx" refers to any one of the naturally occurring or non-naturally occurring amino acid residues known in the art or to a modification of a nearby residue (Watson et al., book (1987, Molecular Biology of the Gene, 4th Edition, The Benjamin Cummings Pub. Co., p. 224), incorporated herein by reference).

Apparatuses

Chemical reactions can be processed using an apparatus provided herein. Generally, an apparatus includes a substrate and porous material. The substrate includes a top surface and bottom surface, although it will be understood that the use of terms such as 'top' and 'bottom' as used herein can be to distinguish two surfaces and as such may be synonymous with terms such as, "first" and "second." The top surface can include a plurality of depressions or wells. In some embodiments, the bottom surface can include a plurality of raised areas, where each raised area corresponds to a depression on the top surface. In some embodiments, the raised areas include areas, which are formed from substrate material, and which extend beyond the plane of the bottom surface. In some embodiments, the raised areas are formed from the same material from which the substrate is made. In certain embodiments, the substrate is a single sheet of material and the wells and raised areas are formed from this single sheet of material.

In some embodiments of the compositions described herein, the depressions can be patterned on the surface of the substrate, for example, in a geometric pattern, such as a series of rows and columns. In some embodiments, the pattern can correspond to the pattern of wells in a multiwell plate, for example, a 96 multiwell plate, a 384 multiwell plate, and a 1536 multiwell plate.

With respect to the substrate, the size of the depressions and corresponding raised areas will depend on the scale of the chemical reactions to be performed on the substrate. In some embodiments, the volume of the depressions or wells can be less than about 500 µl, less than about 400 µl, less than about 300 µl, less than about 200 µl, or less than about 100 µl. In other embodiments, the volume of the depressions or wells can be less than about 90 µl, less than about 80 µl, less than about 70 µl, less than about 60 µl, less than about 50 µl, less than about 40 µl, less than about 30 µl, less than about 20 µl, or less than about 10 µl. In still other embodiments, the volume of the depressions or wells can be less than about 9 µl, less than about 8 µl, less than about 7 µl, less than about 6 µl, less than about 5 µl, less than about 4 µl, less than about 3 µl, less than about 2 µl, or less than about 1 µl. In some embodiments, the depressions or wells can be on the nanoliter or picoliter scale.

In preferred embodiments, the depressions or wells are each approximately the same dimensions. In more preferred embodiments, the depressions or wells each hold approximately the same volume. In some embodiments, one or more of the depressions or wells have dimensions or fluid capacities that are substantially different than other depressions or wells associated with the substrate.

The shape of a depression or well can vary with the application. In some embodiments, the side of a well from the top of the well to the bottom or the well can be any appropriate shape, for example, straight, stepped, and rounded. The bottom of a well may be any appropriate shape, for example, straight, stepped, and rounded. The edge of a well can be any appropriate shape, for example, circular, and any geometric shape.

In some embodiments, the substrate can comprise a sheet. The sheet can be pliable or rigid, and can have one or more edges. An example of a sheet with a single edge can be a disc. In some embodiments, two edges of a sheet can be joined to form a belt. A belt is an example of a sheet that has two exterior edges. In preferred embodiments, a belt is an example of a sheet that can have only two exterior edges. In embodiments where the substrate is made from a pliable material, a pliable belt is formed. A pliable belt can be particularly useful for processing chemical reactions that undergo a series of repetitive steps. For example, a pliable belt can be moved so that depressions or wells present on the belt can repetitively visit stations multiple times in a system for processing chemical reactions.

The substrate can be adapted to be moved by a variety of methods. For example, the substrate can be moved by engaging one or more surfaces of the substrate with a device, such as a roller, that produces friction when engaged with a surface of the substrate. It will be understood that the friction between the substrate and In some embodiments, the at least one edge of a substrate can be adapted to contact a member for moving the substrate. In some embodiments, an edge of a substrate can be adapted to contact a roller, for example, the edge can include perforations or indentations that mesh with a roller that moves the substrate. Other methods of moving the substrate that are known in the art, for example, manipulation with a turn table or manipulation with a robotic arm, are also contemplated herein.

In certain embodiments described herein, the substrate can comprise a material that is relatively inert to the chemical processes that occur thereon. Examples of materials include thermoplastics such as polypropylenes; polyolefines such as ethylene vinyl acetate; ethylene methyl acrylate; polyethylenes; ethylene-propylene rubbers; ethylene-propylenediene rubbers; poly(1-butene); polystyrene; poly(2-butene); poly(1-pentene); poly(2-pentene); ploy(3-methyl-1-pentene); poly(4-methyl-1-pentene); 1,2-poly-1,3-butadiene; 1,4-poly-1,3-butadiene; polyisoprene; polychloroprene; poly(vinyl acetate); poly(vinyldiene chloride); and mixtures and derivatives thereof. More examples of materials include fluoropolymers such as PVDF and PTFE, nylons, polycarbonates, poly(ether sulfones), and mixtures thereof. In some embodiments, the substrate is formed from a thermoset material.

Some of the apparatuses described herein include a substrate having a porous material associated therewith. In some embodiments, the porous material can be associated with a well or depression. In some embodiments, the porous material can coat a portion of the sides of a well or depression. In some embodiments, the porous material can fill a portion of a well or depression. In other embodiments the porous material can be embedded into one or more surfaces of a well or depression. In a preferred embodiment, the material is embedded into at least the bottom surface of the interior of a well or depression. It will be appreciated that not all wells or depressions need contain or otherwise be associated with porous material. In preferred embodiments, at least some of the wells or depressions contain or are otherwise associated with one or more porous materials.

Advantageously, the porous material can provide a large surface area on which chemical reactions may occur. Accordingly, in some embodiments, the ratio of the surface area to the volume of the porous material can be greater than about 2, greater than about 3, greater than about 4, greater than about 5, greater than about 6, greater than about 7, greater than about 8, greater than about 9, 10, greater than about 15, greater than about 20, greater than about 25, greater than about 30, greater than about 35, greater than about 40, greater than about 45, greater than about 50, greater than about 60, greater than about 70, greater than about 80, greater than about 90, greater than about 100, greater than about 150, greater than about 200, greater than about 250, greater than about 300, greater than about 350, greater than about 400, greater than about 450, greater than about 500, greater than about 600, greater than about 700, greater than about 800, greater than about 900 or greater than about 1000. In certain embodiments, the porous material can comprise pores having an average pore size of greater than about 100 Å, greater than about 200 Å, greater than about 300 Å, greater than about 400 Å, greater than about 500 Å, greater than about 600 Å, greater than about 700 Å, greater than about 800 Å, greater than about 900 Å, or greater than about 1000 Å. In other embodiments, the porous material comprises pores that have an average pore size of greater than about 1500 Å, greater than about 2000 Å, greater than about 2500 Å, or greater than about 3000 Å. In some embodiments, the porous material can comprises pores having an average pore size ranging from about 100 Å to about 3000 Å, ranging from about 200 Å to about 3000 Å, ranging from about 300 Å to about 3000 Å, ranging from about 400 Å to about 3000 Å, ranging from about 500 Å to about 3000 Å, and ranging from about 600 Å to about 3000 Å, ranging from about 700 Å to about 3000 Å, ranging from about 800 Å to about 3000 Å, ranging from about 900 Å to about 3000 Å, ranging from about 1000 Å to about 3000 Å, ranging from about 1100 Å to about 3000 Å, ranging from about 1200 Å to about 3000 Å, ranging from about 1300 Å to about 3000 Å, ranging from about 1400 Å to about 3000 Å, ranging from about 1500 Å to about 3000 Å, and ranging from greater than about 1500 Å to about 3000 Å. In some embodiments, the pore size ranges from about 100 Å to about 2500 Å, from about 100 Å to about 2000 Å, from about 100 Å to about 1500 Å, and from about 100 Å to about 1000 Å. The amount of porous material associated with a well or depression can range from about 1 ng to about 1 g. In a preferred embodiment, the amount of porous material associated with a well or depression ranges from about 100 ng to about 10 mg. In other preferred embodiments, the amount of porous material associate with a well or depression is less than about 500 µg, less than about 400 µg, less than about 300 µg, less than about 200 µg, less than about 100 µg, less than about 90 µg, less than about 80 µg, less than about 70 µg, less than about 60 µg, less than about 50 µg, less than about 40 µg, less than about 30 µg, less than about 20 µg, less than about 10 µg, less than about 9 µg, less than about 8 µg, less than about 7 µg, less than about 6 µg, less than about 5 µg, less than about 4 µg, less than about 3 µg, less than about 2 µg, or less than about 1 µg.

Examples of porous materials that may be used with the substrates described herein include materials such as quartz, glasses, ceramic materials, polymers, and sintered metallic powders. Methods of making porous material by sintering metallic powders are well known and can include heating a metallic powder at high temperature and pressure, and adjusting conditions to control the pore size of the product. More examples of porous materials that may be used with the apparatuses provided herein include controlled pore glass (CPG), and cross-linked polystyrene (PS). In a preferred embodiment, the porous material comprises CPG.

CPG is generally chemically inert against water, organic liquids and exotic elutants. CPG can have a high specific pore volume, namely, a high pore volume per volume of CPG. Table 1 shows example parameters for CPG of different pore sizes.

TABLE 1

| Mean Pore Diameter (Å) | Example specific pore volume | | Example specific surface area (m²/g) |
|---|---|---|---|
| | (cm³/g) | (%) | |
| 75 | 0.4 | 46 | 185 |
| 120 | 0.7 | 60 | 185 |
| 170 | 0.8 | 63 | 140 |
| 240 | 0.9 | 66 | 100 |
| 350 | 1.0 | 68 | 75 |
| 500 | 1.0 | 68 | 50 |

TABLE 1-continued

| Mean Pore Diameter (Å) | Example specific pore volume | | Example specific surface area (m²/g) |
|---|---|---|---|
| | (cm³/g) | (%) | |
| 700 | 1.0 | 68 | 37 |
| 1000 | 1.0 | 68 | 26 |
| 1400 | 1.0 | 68 | 20 |
| 2000 | 1.0 | 68 | 13 |
| 3000 | 1.0 | 68 | 9 |

In some embodiments of the compositions, methods and systems described herein, a porous material can provide a surface for a plurality of reaction sites. The reaction sites can be located directly at the surface of the porous material. In other embodiments, reactions sites can be linked to the surface of the porous material. For example, CPG can be derivatized to attach agents to the porous material. An example of a compound that may be used to derivatize CPG includes aminopropyl triethoxy silane to yield aminopropyl CPG with a reactive amino group. Aminopropyl CPG may be further derivatized with linkers attached to the reactive amino group. For example, the aminopropyl arm may be further extended to result in Long Chain Aminoalkyl (LCAA) CPG. More examples of linkers that may be useful include succinic, diglycolic, or hydroquinone-O,O'-diacetic acid (Q-Linker) linker arms (Song, Q. L. and Sanghvi, Y. S. (2001) Unexpected results and recourse in process optimization of nucleoside 3'-O-succinates. *Nucl. Nucl. Nucleic Acids,* 20, 1267-1270; Mullah, B. and Andrus, A. (1997) Automated synthesis of double dye-labeled oligonucleotides using tetramethylrhodamine (TAMRA) solid supports. *Tetrahedron Lett.,* 38, 5751-5754; and Pon, R. T. and Yu, S. (1997) Hydroquinone-O,O'-diacetic acid ('Q-linker') as a replacement for succinyl and oxalyl linker arms in solid phase oligonucleotide synthesis. Nucleic Acids Res., 25, 3629-3635, the disclosures of which are incorporated herein by reference in their entireties).

In embodiments that include synthesis of polymers such as nucleic acids, peptide nucleic acids, and peptides, linkers can be attached to the reactive amino group of a porous material such as an aminopropyl CPG. Linkers can include non-nucleosidic linkers or nucleoside derived linkers. Non-nucleosidic linkers can be useful as universal linkers. Examples of universal linkers include moieties with hydroxy groups locked in syn-periplanar orientation, (±)-3-amino-1-(4,4'-dimethoxytriphenylmethyl)-2-propanediol (Guzaev A P, and Manoharan M., "A conformationally preorganized universal solid support for efficient oligonucleotide synthesis." J Am Chem Soc. 125(9):2380-1; Alex V. Azhayev and Maxim L. Antopolsky, "Amide group assisted 3'-dephosphorylation of oligonucleotides synthesized on universal A-supports" Tetrahedron 57: 4977-4986, the disclosures of which are incorporated herein by reference in their entireties). Other examples of universal linkers are provided in U.S. Pat. No. 7,576,119, U.S. Pat. No. 7,491,817, U.S. Pat. No. 6,653,468, and U.S. Pat. No. 5,688,940, the disclosures of which are incorporated herein by reference in their entireties. Additional examples of linkers include linkers that comprise activators useful in the synthesis of polymers such as nucleic acids (for example, see U.S. Pat. No. 7,579,459, the disclosure of which incorporated herein by reference in its entirety). In still other embodiments, the linkers can comprises one or more cleavable linkers as set forth in WO92/00091, the disclosure of which is incorporated herein by reference in its entirety.

In some embodiments, linkers can include nucleoside derived linkers. Some such linkers can attach the 3'-hydroxy group of a 3'-terminal nucleoside residue to a porous material via a 3'-O-succinyl arm.

In some embodiments a substrate can include fiducials that are indicative of the location of a well, depression, porous material or other reaction center that is located on the belt. Exemplary fiducials include one or more holes; concave features such as depressions, dimples wells or channels; convex features such as ridges, bumps or peaks; beads; particles, fluorophores, dyes and the like. The substrate can include a fiducial for every reaction center such that the location of each individual fiducial can be correlated with a single reaction center. Alternatively, each fiducial can be correlated with several reaction centers, for example, a row of reaction centers, a matrix of reaction centers or other subset of reaction centers on a substrate.

FIG. 1 shows an embodiment of an apparatus (10), and includes a substrate (20) comprising a sheet and having a plurality of wells (30) on the surface of the sheet. An edge (40) of the substrate is perforated to mesh with the spikes of a roller (50).

Figure 2:
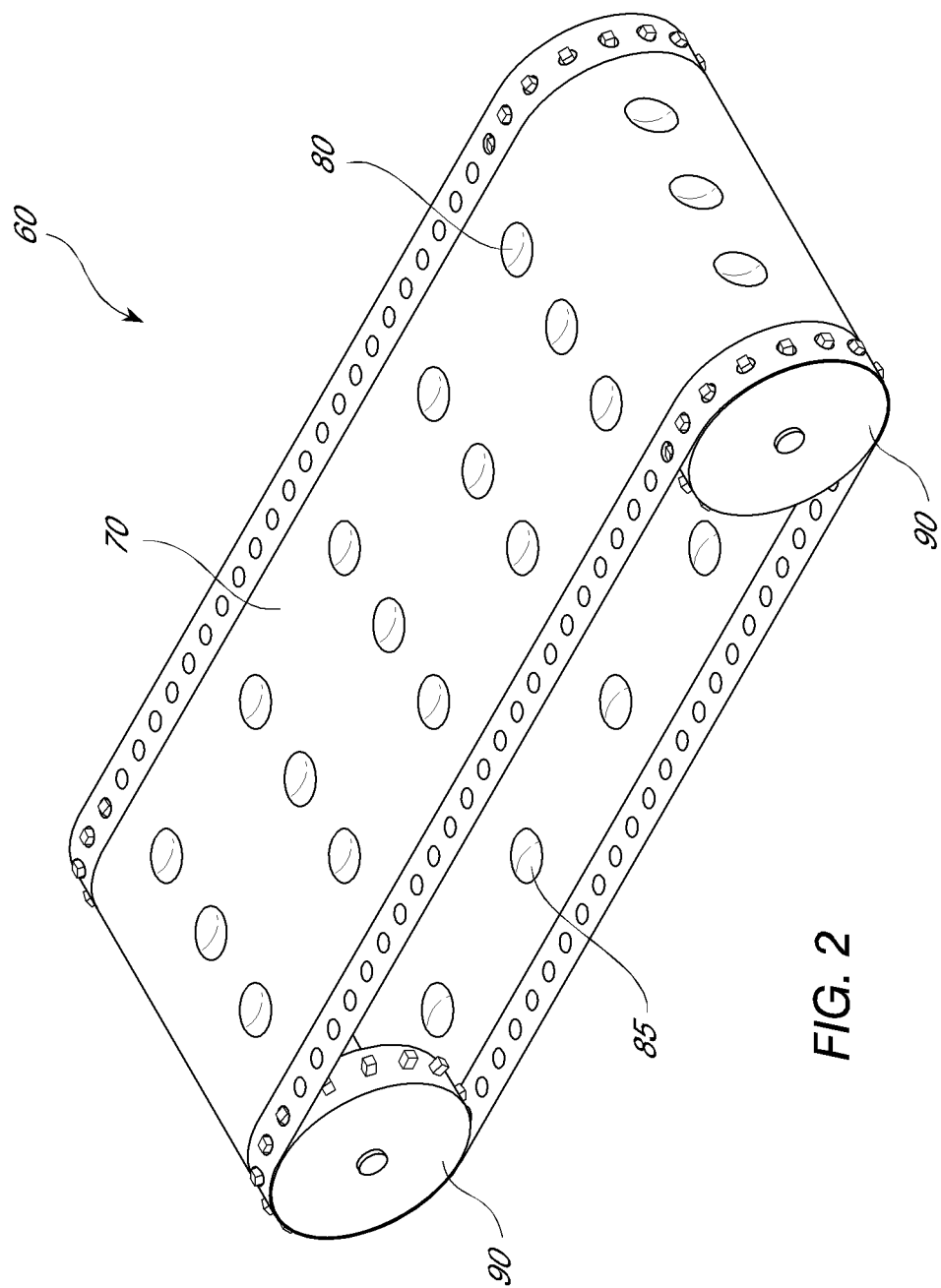
FIG. 2 shows an embodiment of an apparatus for processing chemical reactions, where the apparatus is adapted to form a belt.

FIG. 2 shows an embodiment of an apparatus (60) adapted to form a belt (70) having a plurality of wells (80) on a top surface of the belt and a plurality of raised areas (85) on the bottom surface of the belt. The apparatus contacts two rollers (90).

Manufacturing Apparatuses

Some embodiments of the present invention include methods for making an apparatus described herein. In some embodiments, a plurality of wells or depressions can be made in a substrate by a variety of methods. For example, wells or depressions can be pre-molded in a substrate. For example, molten substrate material can be poured into an appropriately shaped mold and allowed to harden. Alternatively, wells or depressions can be made by dimpling the wells or depressions on a substrate utilizing techniques well known in the art. Dimpling is a preferred method by which to generate wells or depressions in the top surface of the substrate while at the same time producing raised areas on the bottom surface of the substrate that correspond to the wells. In a preferred embodiment, the dimples are formed in a pliable or flexible substrate. In certain preferred embodiments, the material permanently retains most or all of the shape of the dimple. In especially preferred embodiments, the wells are substantially uniform in size and/or volume.

In some embodiments, one or more edges of the substrate can be adapted to be moved. For example, an edge of the substrate can be adapted to mesh with a roller. In one example, the edge of a substrate can be perforated to form holes to mesh with the spikes of a roller. In another example, the edge of a substrate can be dimpled to mesh with a roller.

In some embodiments, a substrate can be adapted to form a belt. Two edges of a substrate can be joined by a variety of methods. For example, an adhesive can be applied to at least two edges of a substrate and can be joined to form a belt. In another example, each edge to be joined can be shaped to mesh with another edge to be joined. In another example, edges to be joined can be clamped together. In a preferred embodiment, the edges can be joined together by applying heat to the surfaces and pressing them together. In other embodiments, one or both edges can be treated with a solvent and then the edges can be pressed together.

In some embodiments, a porous material can be associated with a well or depression. For example, a porous material such as CPG can be provided to a well or depression in forms such as a powder, granules, pellets, or beads. The CPG can be fixed to a well by temporarily increasing the plasticity of the substrate. Methods to increase the plasticity of a substrate can include heating the substrate, or exposing the substrate to agents such as organic solvents. In other embodiments, the porous material can be fixed to a well or depression using an adhesive. In some such embodiments, the adhesive can be inert to the reagents utilized in the chemical processes that can occur on and/or within the porous material. In more embodiments, the porous material can be chemically linked to a well or depression. Methods to chemically link a porous material to a substrate are known in the art. For example, a porous material such as CPG can be derivatized to bind to a substrate. In some such embodiments, the porous material can be derivatized to bind to a substrate and further adapted to provide a plurality of reaction sites.

In some embodiments, the density of reaction sites on the surface of a porous material can be modulated. Modulating the density of the reaction sites can be advantageous in several respects. For example, in chemical reactions such as polymer synthesis, reducing the density of reaction sites can decrease the likelihood of entanglement as polymer molecules are extended. As a result, reducing the density of reaction sites can result in increased fractional yield such that the relative amount of full length polymer product to the amount of non-full length side products is increased. In another example, increasing the density of reaction sites can increase the absolute yield per unit volume for a particular chemical reaction. Methods to modulate the density of reaction sites can include masking potential reaction sites using a blocking agent. In more embodiments, methods to modulate the density of reaction sites can include providing a limited number of reaction sites to a porous material. For example, in embodiments which utilize linkers, the density of linkers can be modulated by limiting reaction conditions that introduce the linkers to the porous material. Examples of reaction conditions that can be limited or otherwise modulated for reduced linker density include reducing the concentration precursor linkers provided to a porous material, reducing the temperature at which reactions are performed, reducing the period of time a porous material is exposed to particular reagents or a combination thereof. In embodiments that utilize derivatized CPG, such as aminopropyl CPG, unreacted amino groups can be capped with reagents such as acetic anhydride. Some embodiments of making an apparatus described herein can include attaching a linker to a reactive amino group.

Some methods of reducing entanglement during polymer synthesis include: obtaining a substrate comprising a plurality of depressions and a porous material comprising a plurality of reaction sites, said porous material fixed in at least some of the depressions of said plurality of depressions; and reducing the density of reaction sites in the porous material by applying a blocking agent to the porous matrix, thereby reducing entanglement during extension of the polymers.

Some embodiments also include providing a liquid reagent to depressions comprising said porous material.

In some embodiments, the substrate comprises a pliable sheet. In some embodiments, the pliable sheet comprises polypropylene. In some embodiments, the substrate is adapted to form a belt. In some embodiments, at least one edge of the belt is adapted to contact a roller for moving the belt. In some embodiments, at least one edge of the substrate is perforated.

In some embodiments, the synthesis of polymers comprises nucleic acid synthesis.

In some embodiments, the porous material comprises controlled pore glass (CPG). In some embodiments, the controlled pore glass (CPG) is present as a powder. In some embodiments, the porous material comprises pores greater than about 500 Å. In some embodiments, the porous material comprises pores ranging from about 500 Å to about 3000 Å.

In some embodiments, the plurality of depressions comprises a plurality of wells. In some embodiments, each well comprises a volume less than about 10 µl. In some embodiments, the depressions are patterned on the substrate.

Some methods of reducing entanglement during polymer synthesis include: obtaining a substrate comprising a plurality of depressions and a porous material comprising a plurality of reaction sites, said porous material fixed in at least some of the depressions of said plurality of depressions; and providing a molecule to the porous material such that a portion of the plurality of reaction sites is occupied by the molecule, thereby reducing entanglement during extension of the polymers.

In some embodiments, the molecule is a nucleotide or nucleotide derivative. In some embodiments, the molecule is a linker or spacer molecule.

Some embodiments also include providing a blocking reagent to the porous material. Some embodiments also include providing a liquid reagent to depressions comprising said porous material.

In some embodiments, the substrate comprises a pliable sheet. In some embodiments, the pliable sheet comprises polypropylene. In some embodiments, the substrate is adapted to form a belt. In some embodiments, at least one edge of the belt is adapted to contact a roller for moving the belt. In some embodiments, at least one edge of the substrate is perforated.

In some embodiments, the synthesis of polymers comprises nucleic acid synthesis.

In some embodiments, the porous material comprises controlled pore glass (CPG). In some embodiments, the controlled pore glass (CPG) is present as a powder. In some embodiments, the porous material comprises pores greater than about 500 Å. In some embodiments, the porous material comprises pores ranging from about 500 Å to about 3000 Å.

In some embodiments, the plurality of depressions comprises a plurality of wells. In some embodiments, each well comprises a volume less than about 10 µl. In some embodiments, the depressions are patterned on the substrate.

Some embodiments of manufacturing an apparatus for processing chemical reactions include: providing a substrate comprising a plurality of depressions; providing a porous material to at least some of the depressions; and fixing the porous material in said at least some of the depressions.

In some embodiments, the substrate comprises a pliable sheet. In some embodiments, the pliable sheet comprises polypropylene. Some embodiments also include joining the ends of the pliable sheet to form a belt. Some embodiments also include perforating at least one edge of the substrate.

In some embodiments, the porous material comprises controlled pore glass (CPG). In some embodiments, the controlled pore glass (CPG) is provided as a powder. In some embodiments, the porous material comprises pores greater than about 500 Å. In some embodiments, the porous material comprises pores ranging from about 500 Å to about 3000 Å.

In some embodiments, the plurality of depressions comprises a plurality of wells. In some embodiments, each well comprises a volume less than about 10 µl. In some embodiments, the depressions are patterned on the substrate.

In some embodiments, the porous material comprises a plurality of reaction sites.

Some embodiments also include applying a blocking agent to the porous material, thereby blocking at least some of the reaction sites.

In some embodiments, the fixing the porous material comprises temporarily increasing the plasticity of the substrate.

In some embodiments, the plasticity of the substrate is increased by heating the substrate. In some embodiments, the plasticity of the substrate is increased by exposing the substrate to an organic solvent.

Some embodiments also include attaching at least one component of a nucleic acid synthesis reaction to said porous material, wherein the chemical reactions are nucleic acid synthesis reactions.

Systems for Processing Chemical Reactions

Some embodiments of the present invention include systems for processing chemical reactions. Many of these systems for processing chemical reactions include at least one dispensing system. A dispensing system can provide one or more liquid reagents to a porous material. Additionally, a dispensing system can include one or more dispensing stations. A dispensing station usually comprises one or more nozzles configured to deliver a reagent to one or more wells or depressions in a substrate. Typically, the wells or depressions comprise a porous material. Examples of nozzles can include piezo-activated nozzles and ink jet nozzles. Such nozzles can provide rapid delivery of reagent to a well or depression. In some embodiments, nozzles can have a localized reservoir to supply a particular reagent to a well or depression. In some embodiments, the reagents can include a deblock reagent, a monomer reagent, an oxidizing reagent, a capping reagent and/or a wash reagent. In some embodiments, a nozzle of a dispensing station can deliver a volume of a reagent to a well or depression ranging from about 100 ml to about 1 pl. In a preferred embodiment, a nozzle of a dispensing station can deliver a volume of a reagent to a well or depression ranging from about 1 ml to about 1 nl. In more preferred embodiments, a nozzle of a dispensing station can deliver a volume of a reagent to a well or depression ranging from about 10 µl to about 100 nl. In still other preferred embodiments, a nozzle of a dispensing station can deliver a volume of a reagent to a well or depression of less than about 500 µl, less than about 400 µl, less than about 300 µl, less than about 200 µl, less than about 100 µl, less than about 90 µl, less than about 80 µl, less than about 70 µl, less than about 60 µl, less than about 50 µl, less than about 40 µl, less than about 30 µl, less than about 20 µl, less than about 10 µl, less than about 9 µl, less than about 8 µl, less than about 7 µl, less than about 6 µl, less than about 5 µl, less than about 4 µl, less than about 3 µl, less than about 2 µl, less than about 1 µl, less than about 900 nl, less than about 800 nl, less than about 700 nl, less than about 600 nl, less than about 500 nl, less than about 400 nl, less than about 300 nl, less than about 200 nl, less than about 100 nl, less than about 90 nl, less than about 80 nl, less than about 70 nl, less than about 60 nl, less than about 50 nl, less than about 40 nl, less than about 30 nl, less than about 20 nl, less than about 10 nl, less than about 9 nl, less than about 8 nl, less than about 7 nl, less than about 6 nl, less than about 5 nl, less than about 4 nl, less than about 3 nl, less than about 2 nl, less than about 1 nl. In other embodiments, a nozzle of a dispensing station can deliver a volume of a reagent to a well or depression of less than about 500 pl, less than about 100 pl, less than about 10 pl, or less than about 1 pl. In some embodiments, a nozzle can deliver a reagent to a well or depression at a rate in ranging from about 5 pl/ms to about 500 nl/ms, 5 pl/ms to about 400 nl/ms, 5 pl/ms to about 300 nl/ms, 5 pl/ms to about 200 nl/ms, and 5 pl/ms to about 100 nl/ms.

Some systems for processing chemical reactions can include a sensing system for determining the location of one or more reaction centers. A sensing system can comprise one or more sensors. A sensor can include, for example, an optical device such as a camera or laser interferometer, a mechanical device or a magnetic device. A sensing system can further include an encoder circuit to convert position information obtained from a sensor to an analog or digital signal. Exemplary encoders include incremental encoders such as incremental rotary encoders and absolute encoders. Such encoders can be obtained from commercial sources such as Renishaw (Gloucestershire, UK) or Agilent Technologies (Santa Clara, Calif.).

A sensor used in a sensing system can be used to detect the position of a reaction center such as a well or depression. In some embodiments, a sensor can detect a characteristic of the reaction center such as the presence of the leading edge of a well or depression. In some embodiments, a sensor can detect the trailing edge of a well or depression. Alternatively or additionally, a sensing system can detect a fiducial that is correlated with the location of a reaction center. Taking as an example a reaction center formed by a well or depression on a belt, a fiducial can be located on the belt, but outside of the well or depression. For example, the fiducial can be a mark or hole in the belt. The belt can include a fiducial for every reaction center such that the location of each individual fiducial can be correlated with a single reaction center. Alternatively, an individual fiducial can be correlated with a group of several wells, for example, a row of wells or an array of wells in several rows and columns. In some embodiments, a sensor system can include an encoder that is configured to control delivery of a reagent to a well, depression or other reaction center. For example, the encoder circuit utilized in a sensing system can be configured to convert position information obtained from a sensor into instructions for controlling the firing of dispensers. The instructions can include reference to a firing table that specifies when to open valves in the dispenser and when to close the valves. An encoder is particularly useful for embodiments in which reaction centers are located on a flexible belt or other substrate having web characteristics. The encoder can provide accurate reagent delivery even if the relative positions of the reaction centers have the potential to change with a variance that is significant compared to the precision of the reagent delivery component of the system. Incremental rotary encoders are particularly useful for embodiments in which reagents are delivered to reaction centers on an arc, as set forth in further detail below. It will be understood that an absolute encoder can be useful as well.

In accordance with the methods set forth herein, reagents can be delivered to reaction centers on a belt while the belt is moving (i.e. without a need to pause movement during reagent delivery). For embodiments in which fiducials are used by an encoding sensor system, the locations of the fiducials relative to one or more reaction centers can be predetermined or mapped. The sensing system can use the mapping information to correlate detection of the fiducial with the position of the one or more reaction centers. A firing table can specify the opening and closing of valves in a dispenser based on count values. Thus, the fiducial can be detected by the sensing system prior to arrival of a reaction center to a dispensing station, the resulting output signal from the encoder of the sensing system can be converted to a count, and the count can be used in reference to the firing table to direct opening of the appropriate valve of the dispensing station. As such, the opening of the valve can occur when the leading edge of the reaction center reaches the dispensing station. The closing of the valve can be specified to occur after a predetermined time period that is correlated with the volume of reagent to be delivered and specified by the firing table to occur before the trailing edge of the reaction center passes the dispensing station. In particular embodiments the firing table can specify events relating to several valves and several reaction centers based on detection of a single fiducial.

Typically, several encoding sensing systems can be present in a chemical reaction system. For example, a separate sensing system can be present for each dispensing station. Thus, a particular dispensing station can be controlled by a sensing system that is separate from the sensing system that controls another dispensing station in the system. Alternatively or additionally, a single sensing system can control more than one dispensing station. For example, a master sensing system can control all of the dispensing stations in a system. The master sensing system can include a single sensor for detection at a single location or several sensors for detection at several locations such that signals from the multiple sensors are fed into a single processor. Although the use of encoders in sensing systems has been exemplified with regard to using the output to control reagent delivery from a dispenser head, it will be understood that the output can be used to control other components of the systems set forth herein or other steps of a process set forth herein. For example, the output can be used to change the rate of passage for reaction centers through a system for example by changing the rate at which rollers spin.

Although the above example describes clocking a firing table from an encoder, it will be understood that the firing table can be clocked based on time in other embodiments. For example each firing table entry can specify an amount of time delay between detection of a fiducial and opening of a valve. In this embodiment an encoder can be used to measure speed for a moving belt having reaction centers to which reagents are to be delivered.

In particular embodiments, a sensor can detect the presence and/or absence of a reagent in a well or depression. Some embodiments include sensors that can detect changes in the local environment of an apparatus. Exemplary sensing systems and exemplary configurations for their use in detecting synthetic reactions are described in US Patent Application Publication No. 2004/0219063, which is incorporated herein by reference in its entirety.

Some systems for processing chemical reactions can include reagent removal systems. In some embodiments, a reagent removal system can be utilized to remove a reagent from a well or depression. Typically, the well or depression can comprise a porous material. In some embodiments, a removal system can include an inlet that can provide a stream of gas. In some embodiments, the stream of gas can be directed towards the well or depression at a pressure sufficient to remove a liquid reagent from the porous material. The pressure and period of time that a stream of gas is directed at a well or depression, and/or a porous material can vary and be optimized to remove a liquid reagent from the well or depression, and/or a porous material. In more embodiments, the stream of gas can be directed to cause a reduction in pressure at the porous material to remove a liquid reagent from the porous material. The stream of gas can comprise a relatively stable or inert gas. Examples of gases that may be used include nitrogen, helium and argon. More examples of gases that may be used include neon, krypton, xenon, and radon. In more embodiments, a reagent removal system can include an outlet that produces a vacuum for removing a liquid reagent. The vacuum can be capable of removing a liquid reagent from a porous material and/or removing a liquid reagent that has been extracted from a porous material. Some reagent removal systems can include an inlet and an outlet to remove a reagent from a well or depression, and/or a porous material.

Some systems for processing chemical reactions can include a driving system. In some embodiments, a driving system can be utilized to move one or more of the apparatus described herein. A driving system can modulate the rate of speed an apparatus is moved between, for example, dispensing stations, outlets of reagent removal systems, inlets of reagent removal systems, and/or compartments of controlled environments. The rate of speed at which an apparatus is moved can depend on the application. An apparatus can be moved by a variety of methods, for example, a driving system can include one or more rollers. As will be appreciated, a roller can be adapted to move one or more of the apparatuses described herein, and one or more of the apparatuses described herein can be adapted to be moved by a roller.

Some systems for processing chemical reactions can include a system for producing and/or maintaining one or more controlled environments. Such controlled environments can be used to modulate particular reactions. In a preferred embodiment, certain conditions or environments under which the reaction is performed can be modulated so as to increase, decrease or optimize certain characteristics or features of the reaction. For example, optimizing reaction conditions can increase reaction efficiencies and can therefore increase the yield of particular reactions. Conditions that can be optimized include, for example, temperature, humidity, and gaseous composition of an environment. Some systems for one or more controlled environments may include closed volumes. For example, a closed volume may include a closed compartment. In some embodiments, a closed volume can be separated from other volumes using a gas knife or gas curtain. In more embodiments, a closed volume can include a cup filled with a dense gas.

In one example of a controlled environment, polynucleotide chemistry is known to be particularly sensitive to the presence of water vapor and air (Gait "Oligonucleotide Synthesis: A practical-approach" Oxford University Press, New York, N.Y., 1984, incorporated by reference in its entirety). The efficiency of coupling reactions, for example, can be significantly reduced by the presence of moisture. To address this sensitivity, systems for processing chemical reactions can include at least one controlled environment in which humidity is significantly decreased. Humidity can be decreased by a variety of methods. For example, an environment can be heated to maintain a dry environment. In another example, an environment can be purged of atmospheric gases, and then, supplied with a dry gas to maintain a dry environment. Several types of gases can be used in a controlled environment, such as stable or inert gases that contain little reactivity on their own. For example, noble gases such as helium, neon, argon, krypton, xenon, and radon are inert gases that can be used in the apparatus. In addition, a gas such as nitrogen can be used.

In another example, an environment can be modulated to introduce one or more gaseous reagents. For example, in nucleic acid synthesis a labile attachment of a polynucleotide to a porous material, such as CPG, can be cleaved using gaseous ammonia or methylamine. In some embodiments, gaseous reagents such as ammonia or methylamine can be used in deprotection reaction acids (Boal, J. H. et al. "Cleavage of oligodeoxyribonucleotides from controlled-pore glass supports and their rapid deprotection by gaseous amines". *Nucleic Acids Research* 24 (15): 3115, or U.S. Pat. No. 5,738,829 each of which is incorporated by reference in its entirety).

Some systems for processing chemical reactions can include a control system. In some embodiments, a control system can be utilized to coordinate one or more of the systems described herein. For example a control system can coordinate a sensing system and dispensing system to deliver a reagent to a well or depression. In another example, a control system can coordinate a sensing system and reagent removal system to remove a reagent from a well or depression. In another example, a control system can coordinate a driving system with any one of the systems described herein to optimize the rate of a continuous chemical process. In some embodiments, a control system can include a CPU, and a memory. In more embodiments, a control system can include software providing, for example, instructions for a continuous chemical process.

Figure 3:
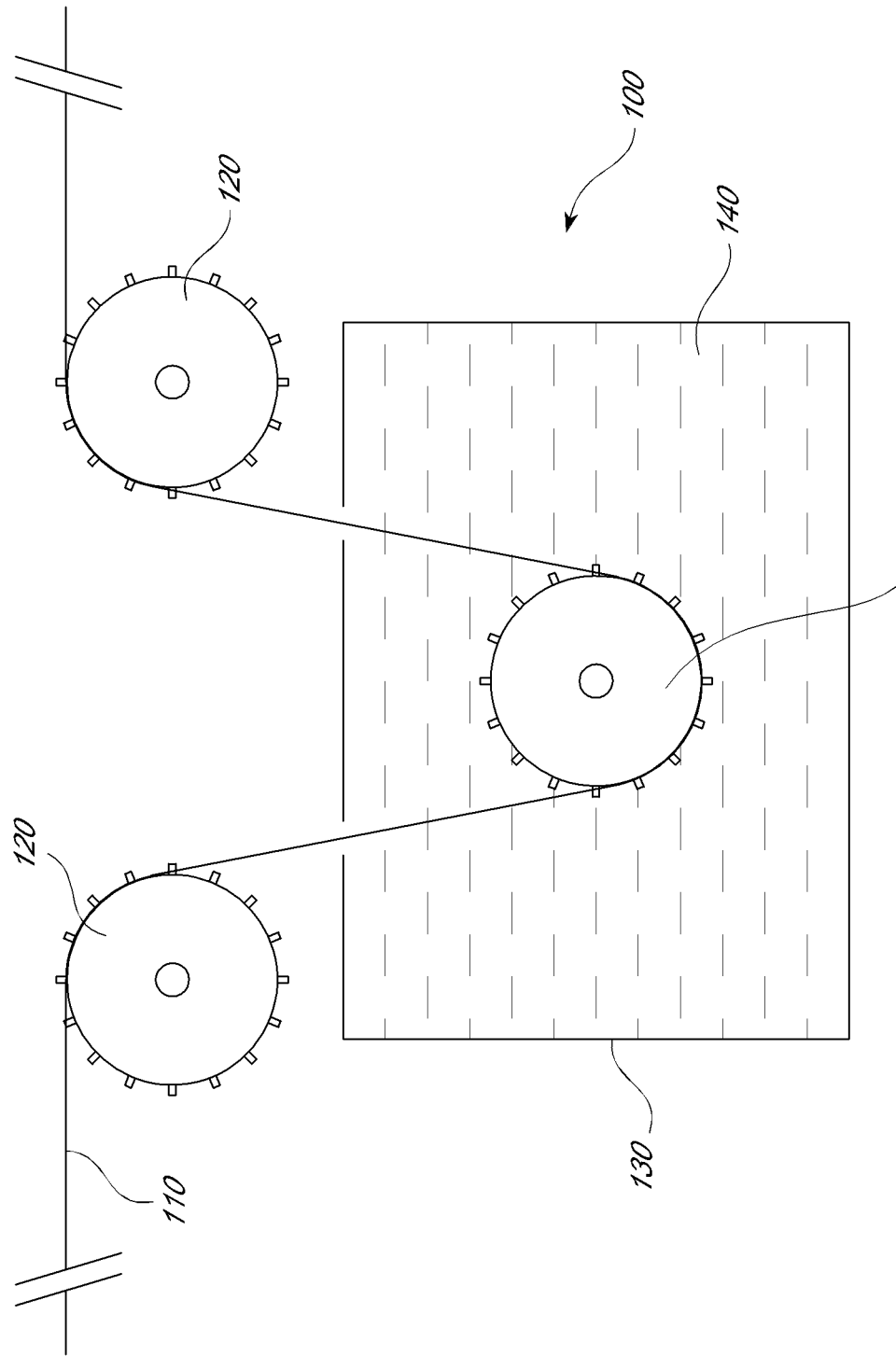
FIG. 3 shows an embodiment of a system for processing chemical reactions.

FIG. 3 shows an embodiment for a portion of a system for processing chemical reactions (100) and includes an apparatus (110) that contacts rollers (120). A portion of the apparatus is moved through a compartment (130) filled with a dry gas (140).

Figure 4:
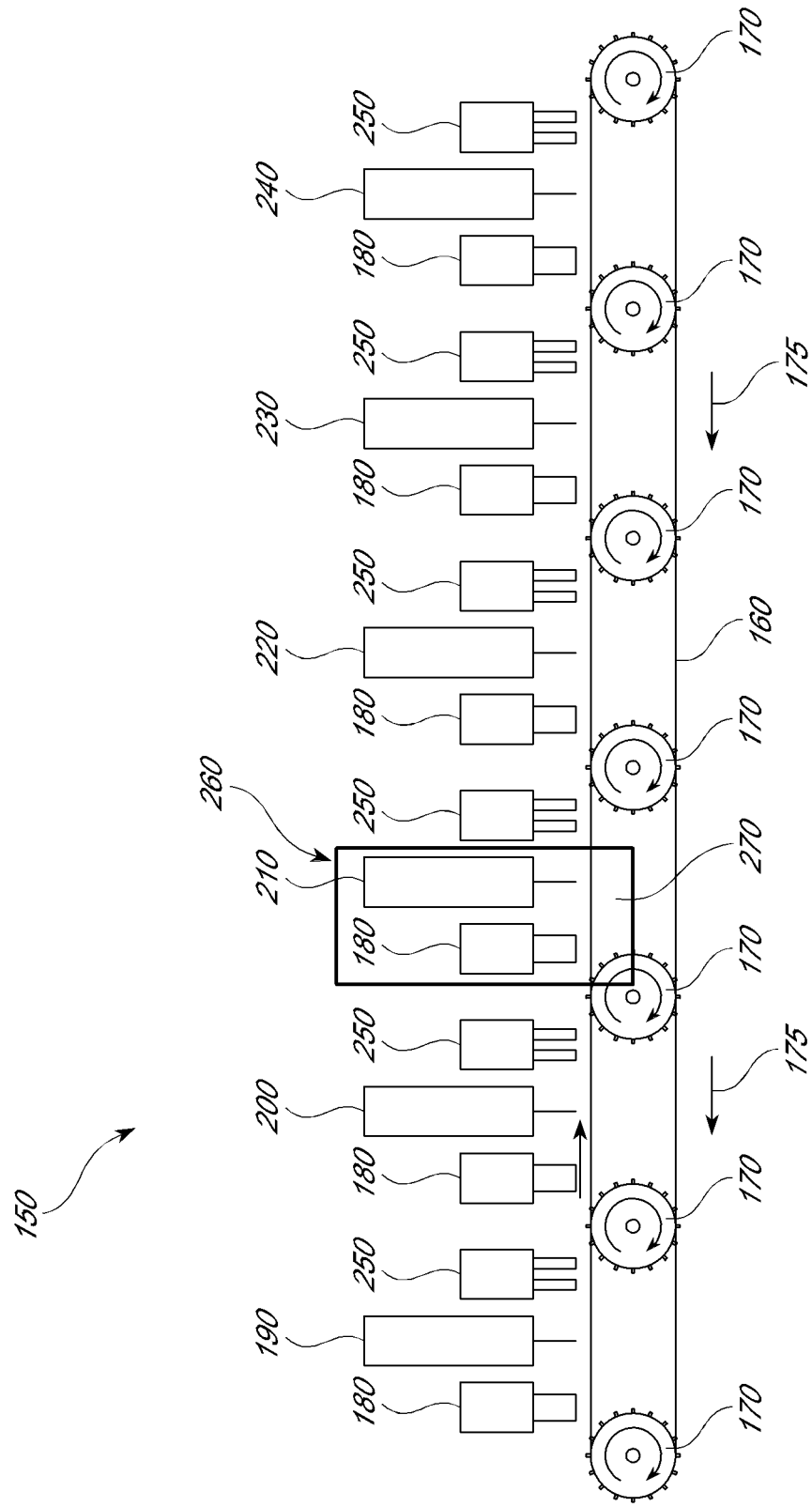
FIG. 4 shows an embodiment of a system for processing chemical reactions.

FIG. 4 shows an embodiment of a system for processing chemical reactions (150) that includes an apparatus adapted to form a belt (160) and is moved by contacting a plurality of rollers (170) and moving the rollers in the same direction (175). The system also includes a plurality of sensors (180). The plurality of dispensing stations includes a deblock reagent dispensing station (190), a first wash reagent dispensing station (200), a coupling reagent dispensing station (210), a second wash reagent dispensing station (220), an oxidizing reagent dispensing station (230), and a capping reagent dispensing station (240). Reagents are removed by plurality of reagent removal systems (250). Coupling reactions occur in a controlled environment (260) containing an inert environment, for example, a environment filled with a dry and/or inert gas (270). Individual reaction centers on the belt contact the dispensing stations in an order that correlates with the sequence of reaction steps that form a cycle of monomer addition to a growing polymer. For example, the dispensing stations exemplified in FIG. 4 are useful for completing the steps for addition of a nucleotide monomer to a growing polynucleotide molecule. As the belt is moved through the system, individual reaction centers on the belt can make repeated laps through the system, such that completion of each lap results in addition of a single monomer species to a polymer species that is growing at the reaction center. Turning again to the exemplary system of FIG. 4, each lap that a reaction center makes through the system will result in addition of another nucleotide species to a polynucleotide species that is growing at the reaction center.

In addition to arranging the order of the dispensing stations to correlate with the order of reaction steps in a cycle of monomer addition, the length of belt between each dispensing station and the rate at which the belt moves can be configured to correlate the time that a reaction spends between dispense events with the amount of time for each reaction to occur. The belt can move in a consistent forward direction or, alternatively, the belt can move in a net forward direction, whereby it periodically pauses or moves backward.

Figure 5:
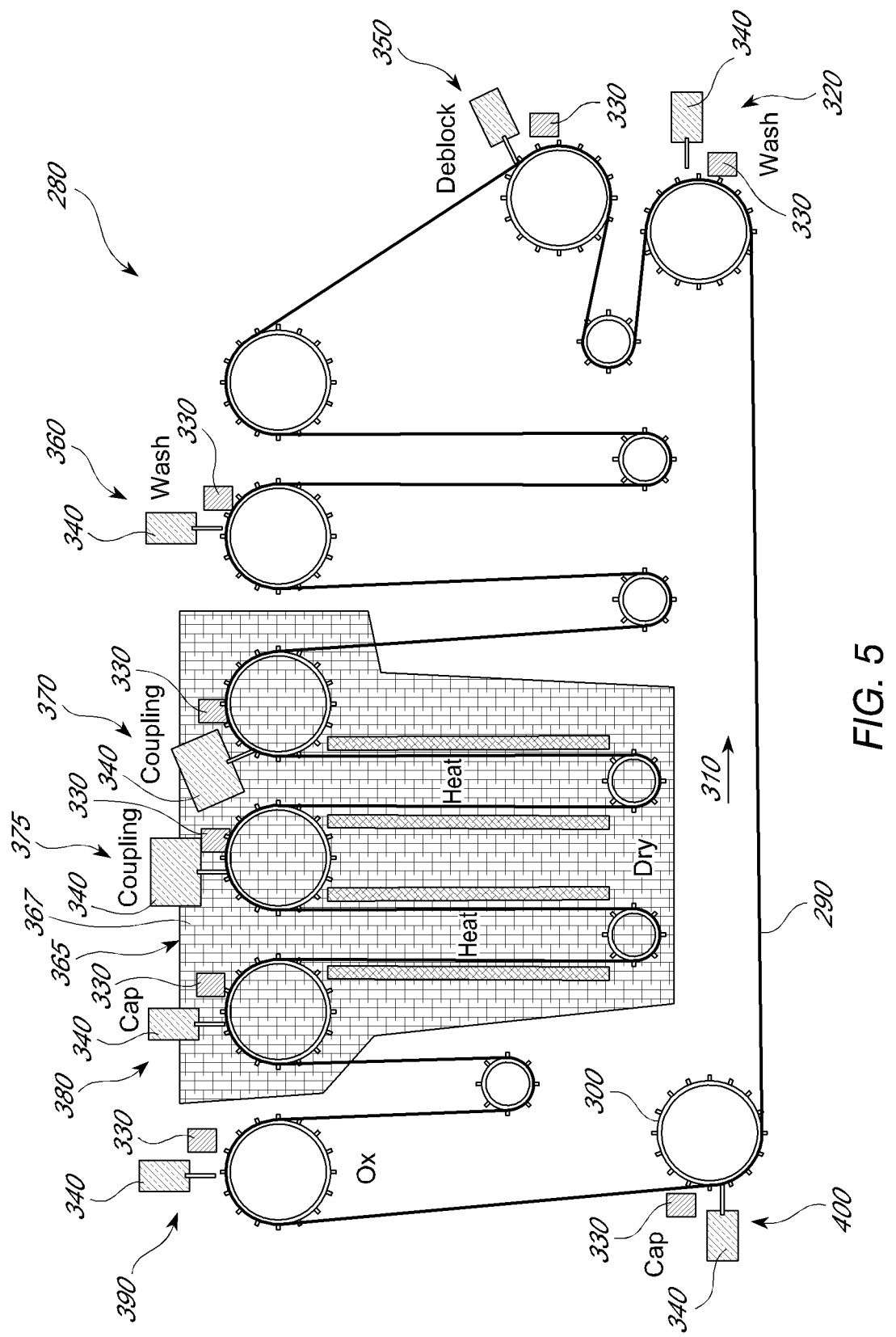
FIG. 5 shows an embodiment of a system for processing chemical reactions.

FIG. 5 shows an embodiment of a system for processing chemical reactions (280) and includes an apparatus adapted to form a belt (290). The belt contacts a plurality of rollers (300) that move the belt in a direction (310). A location on the belt, exemplified here as a reaction center, is moved to a first wash reagent dispensing station (320) that includes a sensor (330) and a piezo-activated nozzle (340) that can dispense a wash reagent to the reaction center. The reaction center on the belt continues to be moved to a deblock reagent dispensing station (350) that includes a sensor (330) and a piezo-activated nozzle (340) that can dispense a deblock reagent to the reaction center. The reaction center continues to be moved to a second wash station (360) that includes a sensor (330) and a piezo-activated nozzle (340) that can dispense a wash reagent to the reaction center. The reaction center continues to be moved into a chamber (365). The chamber is heated and contains a dry inert gas (367). The reaction center is moved to a first coupling reagent dispensing station (370) that includes a sensor (330) and a piezo-activated nozzle (340) that can dispense a coupling reagent to the reaction center. The belt continues to be moved bringing the reaction center to a second coupling reagent dispensing station (375) that includes a sensor (330) and a piezo-activated nozzle (340) that can dispense a coupling reagent to the apparatus. The reaction center continues to be moved to a first capping reagent dispensing station (380) that includes a sensor (330) and a piezo-activated nozzle (340) that can dispense a capping reagent to the reaction center. The reaction center continues to be moved from the chamber to an oxidizing reagent dispensing station (390) that includes a sensor (330) and a piezo-activated nozzle (340) that can dispense an oxidizing reagent to the reaction center. The reaction center continues to be moved to a second capping reagent dispensing station (400) that includes a sensor (330) and a piezo-activated nozzle (340) that can dispense a capping reagent to the reaction center. One or more of the stations of FIG. 5 can include a rotary incremental encoder that communicates with a processor to control opening and closing of the piezo-activated nozzles.

In particular embodiments, one or more dispensing stations are located at positions along the path of a belt that are opposite a roller. Placement of dispensing stations opposite a roller allows liquid to be dispensed to the belt at a location that the belt is in contact with the roller. The belt can contact the roller in a way that it is stretched or flattened across the surface of the roller. For example, the dispensing station can be placed opposite a location where the belt arcs over a roller as shown in FIG. 5. Thus, waviness or other imperfections that may be present in a belt can be temporarily removed to provide improved accuracy of liquid delivery. As exemplified by the system of FIG. 5, all of the dispensing stations can be placed opposite a roller. However, in particular embodiments one or more of the dispensing stations in a system need not be placed over a roller. Similarly, at least one of the sensors in a system or even all of the sensors can be placed opposite a roller. However, the sensors need not be placed opposite a roller in all embodiments and one or more sensors can be placed in locations that are not opposite a roller.

Some embodiments of a chemical reaction processing system include: a substrate comprising a plurality of depressions and a porous material comprising a plurality of reaction sites, said porous material fixed in at least some of the depressions of said plurality of depressions; and one or more dispensing stations configured to dispense a liquid reagent into said at least some of the depressions.

In some embodiments, each of said one or more dispensing stations comprises a plurality of nozzles. In some embodiments, the nozzles are piezo-activated nozzles.

In some embodiments, the porous material has a surface area to volume ratio greater than five.

Some embodiments also include a sensor for detecting the presence of a depression at a dispensing station. In some embodiments, the sensor activates dispensing from the dispensing station when a leading edge of a depression engages the sensor. In some embodiments, the sensor deactivates dispensing from the dispensing station when a trailing edge of a depression engages the sensor.

Some embodiments also include a reagent removal system. In some embodiments, the reagent removal system comprises an inlet that produces a stream of gas capable of extracting reagent from the porous material. In some embodiments, the reagent removal system further comprises an outlet that produces a vacuum that is capable of removing reagent extracted from the porous material. In some embodiments, the reagent removal system comprises an outlet that produces a vacuum that is capable of extracting reagent from the porous material.

Some embodiments also include a control system that coordinates reagent dispensing and reagent removal.

In some embodiments, the one or more dispensing stations dispense reagents selected from a deblock reagent, a monomer reagent, an oxidizing reagent, a capping reagent and a wash reagent. In some embodiments, the one or more dispensing stations dispense reagents at a rate ranging from about 5 pl/ms to about 500 nl/ms.

In some embodiments, the substrate comprises a pliable sheet. In some embodiments, the pliable sheet comprises polypropylene. In some embodiments, the substrate is adapted to form a belt. In some embodiments, least one edge of the belt is adapted to contact a roller for moving the belt. In some embodiments, at least one edge of the substrate is perforated.

In some embodiments, the porous material comprises controlled pore glass (CPG). In some embodiments, the controlled pore glass (CPG) is present as a powder. In some embodiments, the porous material comprises pores greater than about 500 Å. In some embodiments, the porous material comprises pores ranging from about 500 Å to about 3000 Å.

In some embodiments, the plurality of depressions comprises a plurality of wells. In some embodiments, each well comprises a volume less than about 10 µl. In some embodiments, the depressions are patterned on the substrate.

In some embodiments, at least some of the reaction sites are blocked.

In some embodiments, the chemical reactions are nucleic acid synthesis reactions and said porous material has at least one component of the nucleic acid synthesis reactions attached thereto.

Methods for Processing Chemical Reactions

Some embodiments of the present invention include methods for processing chemical reactions. Such methods include providing one or more reagents to a well or depression by moving a substrate to one or more dispensing stations. Some embodiments include detecting the location of a well or depression. For example, the location of a well or depression in relation to a dispensing station can be detected. Some embodiments include dispensing a reagent to a depression or well. The amount and rate of reagent dispensed will vary according to the application. Some methods include detecting the presence of a reagent in a well or depression, and/or a porous material. More methods include moving a substrate from a dispensing station. The period of time a reagent contacts a well or depression, a porous material, and/or a reaction site will vary according to the application. Generally, the period of time will be sufficient for a reaction to occur at a reaction site. Accordingly, some methods include allowing sufficient time for a reaction to occur, for example, between a reagent and a moiety at a reaction site. More methods include removing a reagent from a well or depression. Some such methods can include moving a substrate to an inlet of a reagent removal system. The location of a well or depression can be detected, and an inlet of a reagent removal system can produce a stream of gas that can be utilized to extract liquid reagent from a well or depression, and/or a porous material. In more methods, an outlet of a reagent removal system can produce a vacuum to remove a reagent from a well or depression, and/or a porous material. In some methods, an inlet and outlet of a reagent removal system can be utilized to remove a reagent from a well or depression, and/or a porous material. Some methods can include detecting the absence of a reagent from a well or depression. Some embodiments of methods for processing chemical reactions include repeating providing one or more reagents to a well or depression by moving a substrate to one or more dispensing stations.

The product of a chemical process can be removed from a reaction site by various methods. In some embodiments, a well or depression of an apparatus can be removed from the apparatus. For example, the well or depression comprising a porous material can be removed and the product of a chemical reaction at a reaction site on a porous material can be eluted from the porous material and/or chemically extracted. For example, in nucleic acid synthesis, a reagent such as ammonium hydroxide, or methylamine, can be used to cleave the labile linkage between aminoalkylated CPG and a leader nucleoside. In preferred embodiments, an apparatus comprising a pliable sheet, or a pliable belt, can be removed from the system for processing chemical reactions. Because the sheet or belt is pliable, it can be easily coiled or formed into another relatively compact shape and then placed in a chamber. In a preferred embodiment, the chamber can be filled with liquid or gas vapor. In especially preferred embodiments, the gas vapor is methylamine or ammonia.

Some methods for processing chemical reactions include: obtaining a substrate comprising a plurality of depressions and a porous material comprising a plurality of reaction sites, said porous material fixed in at least some of the depressions of said plurality of depressions; and providing a liquid reagent to the porous material by moving the substrate so that the depressions receive said reagent from one or more dispensing stations.

In some embodiments, each of said one or more dispensing stations comprises a plurality of nozzles. In some embodiments, the nozzles are piezo-activated nozzles.

In some embodiments, the porous material has a surface area to volume ratio greater than five.

Some embodiments also include detecting the presence of a depression at a dispensing station. In some embodiments, detecting comprises engaging a sensor with a leading edge of a depression, thereby activating dispensing from the dispensing station. In some embodiments, detecting comprises engaging a sensor with a trailing edge of a depression, thereby deactivating dispensing from the dispensing station.

Some embodiments also include removing said reagent. In some embodiments, removing the reagent comprises directing a stream of gas to said depressions, thereby extracting reagent from the porous material. In some embodiments, removing the reagent further comprises directing a vacuum to said depressions, thereby removing reagent extracted from the porous material by said stream of gas. In some embodiments, removing the reagent comprises directing a vacuum to said depressions, thereby extracting reagent from the porous material.

In some embodiments, the one or more dispensing stations dispense reagents selected from a deblock reagent, a monomer reagent, an oxidizing reagent, a capping reagent and a wash reagent.

In some embodiments, the substrate is moved at a rate ranging from about 10 µm/second to about 10 cm/second. In some embodiments, the substrate comprises a pliable sheet. In some embodiments, the pliable sheet comprises polypropylene. In some embodiments, the substrate is adapted to form a belt. In some embodiments, at least one edge of the belt is adapted to contact a roller for moving the belt. In some embodiments, at least one edge of the substrate is perforated.

In some embodiments, the reagent comprises at least one component of a nucleic acid synthesis reaction.

Some embodiments also include coiling the substrate and placing the substrate into a chamber. In some embodiments, the chamber comprises gaseous ammonia or methylamine.

In some embodiments, the chemical reactions comprise nucleic acid synthesis reactions.

Some embodiments also include eluting nucleic acids from the porous material by providing an eluant to the plurality of depressions.

In some embodiments, the porous material comprises controlled pore glass (CPG). In some embodiments, the controlled pore glass (CPG) is present as a powder. In some embodiments, the porous material comprises pores greater than about 500 Å. In some embodiments, the porous material comprises pores ranging from about 500 Å to about 3000 Å.

In some embodiments, the plurality of depressions comprises a plurality of wells. In some embodiments, each well comprises a volume less than about 10 µl. In some embodiments, the depressions are patterned on the substrate.

Some embodiments also include blocking at least some of the reaction sites.

Methods for Reducing the Cost of Performing a Chemical Reaction

Some embodiments of the present invention relate to methods for reducing the cost of performing a chemical reaction. Some such embodiments can facilitate the use of a significantly reduced volume of liquid reagent in particular chemical reactions. For example, the use of a porous material, such as CPG, can provide a large surface area on which chemical reaction can be performed in a relatively small volume. It will also be appreciated that loss of liquid reagent by evaporation can be a significant issue in reactions that utilize significantly small volumes. In some embodiments described herein, the use of porous materials can significantly reduce loss of liquid reagent through processes such as evaporation.

Some methods include the use of a substrate described herein. The substrate can include a plurality of depressions and a porous material. The porous material can contain a plurality of reaction sites, and be porous material fixed in at least some of the depressions of the plurality of depressions. In some such methods a liquid reagent can be provided to the porous material. The porous material can have an internal volume such that at least a portion of the provided liquid reagent is absorbed by the porous material. At least a portion of the liquid reagent can include at least about 1%, at least about 5%, at least about 10%, at least about 20%, at least about 30%, at least about 40%, at least about 50%, at least about 60%, at least about 70%, at least about 80% and at least about 90%. In some embodiments, at least a portion can include about 100%. Absorption of the liquid reagent can increase contact between the liquid reagent and reaction sites. In addition, absorption of the liquid reagent can reduce subsequent loss of volume of the liquid reagent through processes such as evaporation. The volume of a liquid reagent provided to a porous material can be less than about 500 µl, less than about 400 µl, less than about 300 µl, less than about 200 µl, less than about 100 µl, less than about 90 µl, less than about 80 µl, less than about 70 µl, less than about 60 µl, less than about 50 µl, less than about 40 µl, less than about 30 µl, less than about 20 µl, less than about 10 µl, less than about 9 µl, less than about 8 µl, less than about 7 µl, less than about 6 µl, less than about 5 µl, less than about 4 µl, less than about 3 µl, less than about 2 µl, less than about 1 µl, less than about 900 nl, less than about 800 nl, less than about 700 nl, less than about 600 nl, less than about 500 nl, less than about 400 nl, less than about 300 nl, less than about 200 nl, less than about 100 nl, less than about 90 nl, less than about 80 nl, less than about 70 nl, less than about 60 nl, less than about 50 nl, less than about 40 nl, less than about 30 nl, less than about 20 nl, less than about 10 nl, less than about 9 nl, less than about 8 nl, less than about 7 nl, less than about 6 nl, less than about 5 nl, less than about 4 nl, less than about 3 nl, less than about 2 nl, less than about 1 nl. In other embodiments, the volume of a liquid reagent provided to a porous material can be less than about 500 pl, less than about 100 pl, less than about 10 pl, or less than about 1 pl. More methods include providing a second liquid reagent to a porous material. In some such methods, at least a portion of the second liquid reagent can be absorbed by the porous material.

Some embodiments of the methods for reducing the cost of performing chemical reactions include allowing sufficient time for a chemical reaction to occur. Sufficient time will vary with the application of the methods used. For example, in some embodiments, sufficient time for a chemical reaction to occur can be less than about 100 s, less than about 90 s, less than about 80 s, less than about 70 s, less than about 60 s, less than about 50 s, less than about 40 s, less than about 30 s, less than about 20 s, and less than about 10 s, and can be less than about 1000 µs, less than about 900 µs, less than about 800 µs, less than about 700 µs, less than about 600 µs, less than about 500 µs, less than about 400 µs, less than about 300 µs, less than about 200 µs, and less than about 100 µs, less than about 90 µs, less than about 80 µs, less than about 70 µs, less than about 60 µs, less than about 50 µs, less than about 40 µs, less than about 30 µs, less than about 20 µs, and less than about 10 ms, and less than about 1000 µs, less than about 900 µs, less than about 800 µs, less than about 700 µs, less than about 600 µs, less than about 500 µs, less than about 400 µs, less than about 300 µs, less than about 200 µs, and less than about 100 µs, less than about 90 µs, less than about 80 µs, less than about 70 µs, less than about 60 µs, less than about 50 µs, less than about 40 µs, less than about 30 µs, less than about 20 µs, and less than about 10 µs, and less than about 1000 ns, less than about 900 ns, less than about 800 ns, less than about 700 ns, less than about 600 ns, less than about 500 ns, less than about 400 ns, less than about 300 ns, less than about 200 ns, and less than 100 ns.

Some embodiments of the methods for reducing the cost of performing chemical reactions include removing a first liquid reagent from a porous material. Methods for removing a reagent form a porous material are described herein. The first reagent may be removed before addition of a second liquid reagent, may be removed subsequent to the addition of the second liquid reagent. Typically, liquid reagents can include at least one component of a nucleic acid synthesis reaction. Examples of such reagents include a deblock reagent, a monomer reagent, an oxidizing reagent, a capping reagent and a wash reagent.

Some methods for reducing the cost of performing a chemical reaction include: (a) obtaining a substrate comprising a plurality of depressions and a porous material comprising a plurality of reaction sites, said porous material fixed in at least some of the depressions of said plurality of depressions; (b) providing a first liquid reagent to depressions comprising said porous material, wherein said first liquid reagent is absorbed by the porous material, and wherein the combined volume of the first liquid reagent and a second liquid reagent is substantially contained within the porous material; (c) providing a second liquid reagent to depressions comprising said porous material, wherein said second liquid reagent is absorbed by the porous material; and (d) allowing sufficient time for the chemical reaction, thereby performing the chemical reaction at a reduced cost.

In some embodiments, the amount of the first liquid reagent is less than about 100 nl.

Some embodiments also include removing the first liquid reagent from the porous material. Some embodiments also include dispensing at least a second liquid reagent to depressions comprising said porous material. In some embodiments, the first or second liquid reagent comprises at least one component of a nucleic acid synthesis reaction. In some embodiments, the first or second liquid reagent is selected from a deblock reagent, a monomer reagent, an oxidizing reagent, a capping reagent and a wash reagent.

In some embodiments, the substrate comprises a pliable sheet. In some embodiments, the pliable sheet comprises polypropylene. In some embodiments, the substrate is adapted to form a belt. In some embodiments, at least one edge of the belt is adapted to contact a roller for moving the belt. In some embodiments, at least one edge of the substrate is perforated.

In some embodiments, the chemical reactions comprise nucleic acid synthesis reactions.

In some embodiments, the porous material comprises controlled pore glass (CPG). In some embodiments, the controlled pore glass (CPG) is present as a powder. In some embodiments, the porous material comprises pores greater than about 500 Å. In some embodiments, the porous material comprises pores ranging from about 500 Å to about 3000 Å.

In some embodiments, the plurality of depressions comprises a plurality of wells. In some embodiments, each well comprises a volume less than about 10 µl. In some embodiments, the depressions are patterned on the substrate.

Some embodiments also include blocking at least some of the reaction sites.

While preferred embodiments of the present invention have been shown and described herein, it will be obvious to those skilled in the art that such embodiments are provided by way of example only. Numerous variations, changes, and substitutions will occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

All publications, patents, and patent applications mentioned in this specification are herein incorporated by reference to the same extent as if each individual publication, patent, or patent application was specifically and individually indicated to be incorporated by reference.

What is claimed is:

1. A chemical reaction processing system comprising:
   a substrate comprising a belt that forms a closed loop, a plurality of depressions being patterned into the belt;
   a porous material comprising a plurality of reaction sites, said porous material fixed in at least some of the depressions of said plurality of depressions; and
   one or more dispensing stations configured to dispense a liquid reagent into said at least some of the depressions.

2. The system of claim 1, wherein each of said one or more dispensing stations comprises a plurality of nozzles.

3. The system of claim 1, wherein the porous material has a surface area to volume ratio greater than five.

4. The system of claim 1, further comprising a sensor positioned to detect the presence of a depression at a dispensing station.

5. The system of claim 4, wherein the sensor comprises an encoder circuit to convert position information from the sensor into instructions to control the dispensing station.

6. The system of claim 4, wherein the sensor comprises an encoder circuit to convert position information from the sensor into instructions to control the rate of passage of the depressions past the dispensing station.

7. The system of claim 1, further comprising a reagent removal system.

8. The system of claim 7, wherein the reagent removal system comprises an inlet that is positioned to direct a stream of gas to the porous material.

9. The system of claim 7, wherein the reagent removal system comprises an outlet that is positioned to direct a vacuum at the porous material.

10. The system of claim 7, further comprising a control system configured to coordinate reagent dispensing and reagent removal.

11. The system of claim 1, wherein the one or more dispensing stations comprise a localized reservoir that contains a reagent selected from a deblock reagent, a monomer reagent, an oxidizing reagent, a capping reagent and a wash reagent.

12. The system of claim 1, wherein the belt comprises polypropylene.

13. The system of claim 1, further comprising a roller in contact with the belt in a configuration to move the belt.

14. The system of claim 1, wherein at least one edge of the substrate is perforated.

15. The system of claim 1, wherein the porous material comprises controlled pore glass (CPG).

16. The system of claim 1, wherein each of said depressions comprises a volume less than about 10 µl.

17. The system of claim 16, wherein each of said depressions comprises a volume less than about 1 µl.

18. The system of claim 1, wherein the chemical reactions are nucleic acid synthesis reactions and said porous material has at least one component of the nucleic acid synthesis reactions attached thereto.

19. The system of claim 13, wherein at least one edge of the belt comprises indentations that contact the roller.

20. The system of claim 13, wherein the one or more dispensing stations are directed to a location on the belt where the belt arcs over a roller.

21. The system of claim 1, wherein the reaction sites are blocked with chemical protecting groups.

22. The system of claim 1, wherein the reaction sites have nucleic acids attached thereto.

23. The system of claim 1, wherein the reaction sites have polypeptides attached thereto.

* * * * *